United States Patent
Wang et al.

(10) Patent No.: US 10,920,561 B2
(45) Date of Patent: Feb. 16, 2021

(54) DRILLING ASSESSMENT SYSTEM

(71) Applicant: Schlumberger Technology Corporation, Sugar Land, TX (US)

(72) Inventors: Yaou Wang, Houston, TX (US); Yuelin Shen, Spring, TX (US); Fei Li, Spring, TX (US); Eric Wilshusen, Kingwood, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 87 days.

(21) Appl. No.: 14/994,010

(22) Filed: Jan. 12, 2016

(65) Prior Publication Data

US 2016/0208597 A1    Jul. 21, 2016

Related U.S. Application Data

(60) Provisional application No. 62/104,239, filed on Jan. 16, 2015.

(51) Int. Cl.

| | |
|---|---|
| *E21B 44/00* | (2006.01) |
| *E21B 7/06* | (2006.01) |
| *E21B 41/00* | (2006.01) |
| *E21B 47/02* | (2006.01) |
| *E21B 44/02* | (2006.01) |
| *G05B 17/02* | (2006.01) |

(52) U.S. Cl.
CPC .............. *E21B 44/00* (2013.01); *E21B 7/06* (2013.01); *E21B 41/00* (2013.01); *E21B 44/02* (2013.01); *E21B 47/02* (2013.01); *G05B 17/02* (2013.01)

(58) Field of Classification Search
CPC ...... E21B 44/00; E21B 41/0092; E21B 45/00; E21B 47/00; E21B 44/02; E21B 47/06; E21B 44/04; E21B 44/06; G05B 15/02; G05B 2219/45129; G05B 13/041
USPC .......................................................... 700/160
See application file for complete search history.

(56) References Cited

U.S. PATENT DOCUMENTS

| | | | |
|---|---|---|---|
| 6,206,108 B1 | 3/2001 | MacDonald et al. | |
| 6,233,524 B1 | 5/2001 | Harrell et al. | |
| 6,785,641 B1 | 8/2004 | Huang | |
| 7,953,586 B2 | 5/2011 | Chen et al. | |
| 10,400,547 B2 | 9/2019 | Chen et al. | |
| 2005/0197777 A1 | 9/2005 | Rodney et al. | |
| 2007/0067147 A1 | 3/2007 | Huang | |
| 2008/0164062 A1 | 7/2008 | Brackin et al. | |
| 2009/0166031 A1 | 7/2009 | Hernandez | |
| 2011/0077924 A1* | 3/2011 | Ertas ...................... | E21B 7/00 703/2 |

(Continued)

OTHER PUBLICATIONS

Tong, K. H., et al. "Optimal sensor placement for mode shapes using improved simulated annealing." Smart Struct. Syst 13.3 (2014): 389-406. (Year: 2014).*

(Continued)

*Primary Examiner* — James J Lee
*Assistant Examiner* — Shon G Foley
(74) *Attorney, Agent, or Firm* — Alec J. McGinn

(57) ABSTRACT

A method can include receiving data acquired via a sensor of a component of a plurality of components arranged in an order at respective axial positions of a toolstring; analyzing at least a portion of the data with respect to a model of the toolstring to generate results; and controlling the toolstring based at least in part on the results.

20 Claims, 26 Drawing Sheets

(56) References Cited

U.S. PATENT DOCUMENTS

| | | | |
|---|---|---|---|
| 2011/0214878 A1 | 9/2011 | Bailey et al. | |
| 2011/0266056 A1* | 11/2011 | Pop | E21B 49/08 |
| | | | 175/50 |
| 2012/0222900 A1 | 9/2012 | Rodney et al. | |
| 2013/0262068 A1* | 10/2013 | Israeli | F17D 5/02 |
| | | | 703/9 |
| 2014/0309978 A1 | 10/2014 | Chen et al. | |
| 2015/0101865 A1* | 4/2015 | Mauldin | E21B 44/00 |
| | | | 175/40 |
| 2017/0002641 A1* | 1/2017 | Dykstra | E21B 44/00 |

OTHER PUBLICATIONS

International Search Report issued in related PCT application PCT/US2016/013141 dated Mar. 29, 2016, 4 pages.

Paiaman, et al. "Effect of Drilling Fluid Properties on Rate of Penetration," 2009, NAFTA60, vol. 3, pp. 129-134.

Schlumberger, Brochure: Drillstring Vibrations and Vibration Modeling, Sep. 1, 2010, http://www.slb.com/~/media/Files/drilling/brochures/drilling_opt/drillstring_vib_br.pdf, 4 pages.

Schlumberger, Brochure: OptiDrill Realtime drilling intelligence service, Oct. 2014, http://www.slb.com/~/media/Files/drilling/brochures/mwd/optidrill_br.pdf, 9 pages.

Schlumberger, Brochure: OptiLog BHA dynamics recorder, 2014, http://www.slb.com/services/drilling/drilling_services_systems/drilling_optimization/~/media/Files/drilling/product_sheets/mwd/optilog_ps.ashx, 2 pages.

International Preliminary Report on Patentability for the equivalent International patent application PCT/US2016/013141 dated Jul. 27, 2017.

PCT IPRP PCT/US2014/034053 (see US 20140309978, above), Oct. 13, 2015 (13 pages).

Ideas Integrated Drillbit Design Platform, Smith Bits, a Schlumberger Company, Jan. 20, 2015 (8 pages).

\* cited by examiner

Scenario 2000

Equipment 2210          Plot 2222

Friction   Contact

Drill Collar Center Trajectory     Plot 2224

DRILLING ASSESSMENT SYSTEM

RELATED APPLICATION

This application claims priority to and the benefit of a U.S. Provisional Application Ser. No. 62/104,239, filed 16 Jan. 2015, which is incorporated by reference herein.

BACKGROUND

A rig may be a system of components that can be operated to form a bore in a geologic environment, to transport equipment into and out of a bore in a geologic environment, etc. As an example, a rig can be used to transport and/or control a toolstring, which may be a drillstring that includes a bit. As an example, a rig may be a system that can be used to drill a wellbore and to acquire information about a geologic environment, drilling, etc. As an example, a rig can include components such as one or more of a mud tank, a mud pump, a derrick or a mast, drawworks, a rotary table or a top drive, a drillstring, power generation equipment and auxiliary equipment. As an example, an offshore rig may include one or more of such components, which may be on a vessel or a drilling platform.

SUMMARY

A method can include receiving data acquired via a sensor of a component of a plurality of components arranged in an order at respective axial positions of a toolstring; analyzing at least a portion of the data with respect to a model of the toolstring to generate results; and controlling the toolstring based at least in part on the results. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Figure 1:
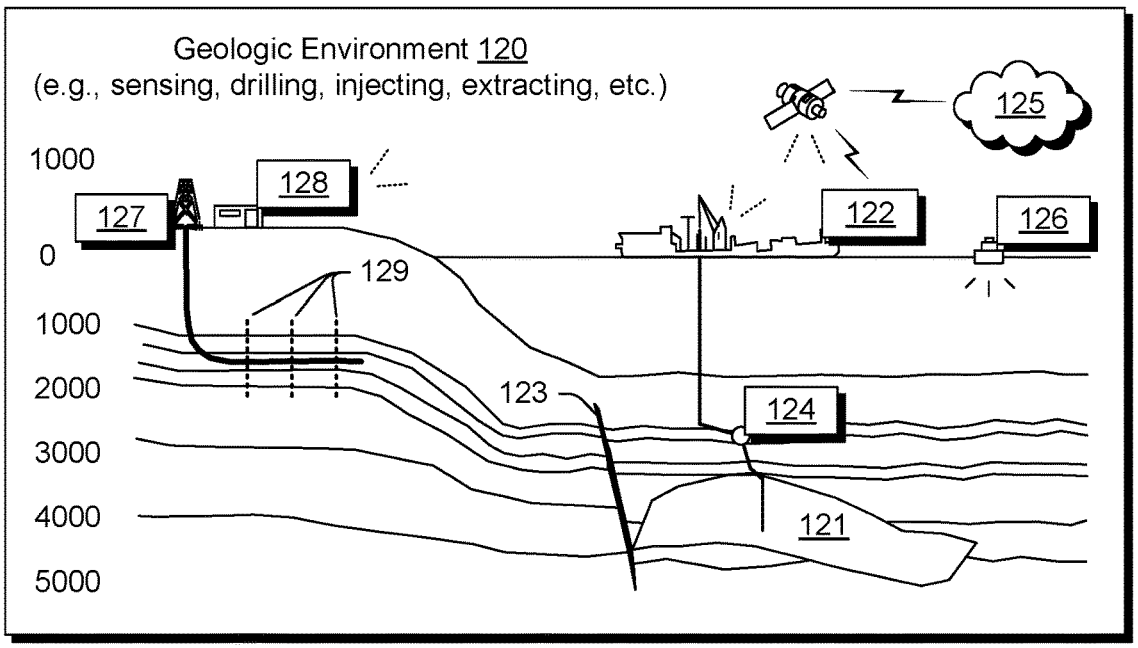
FIG. 1 illustrates examples of equipment in a geologic environment.
Figure 1:
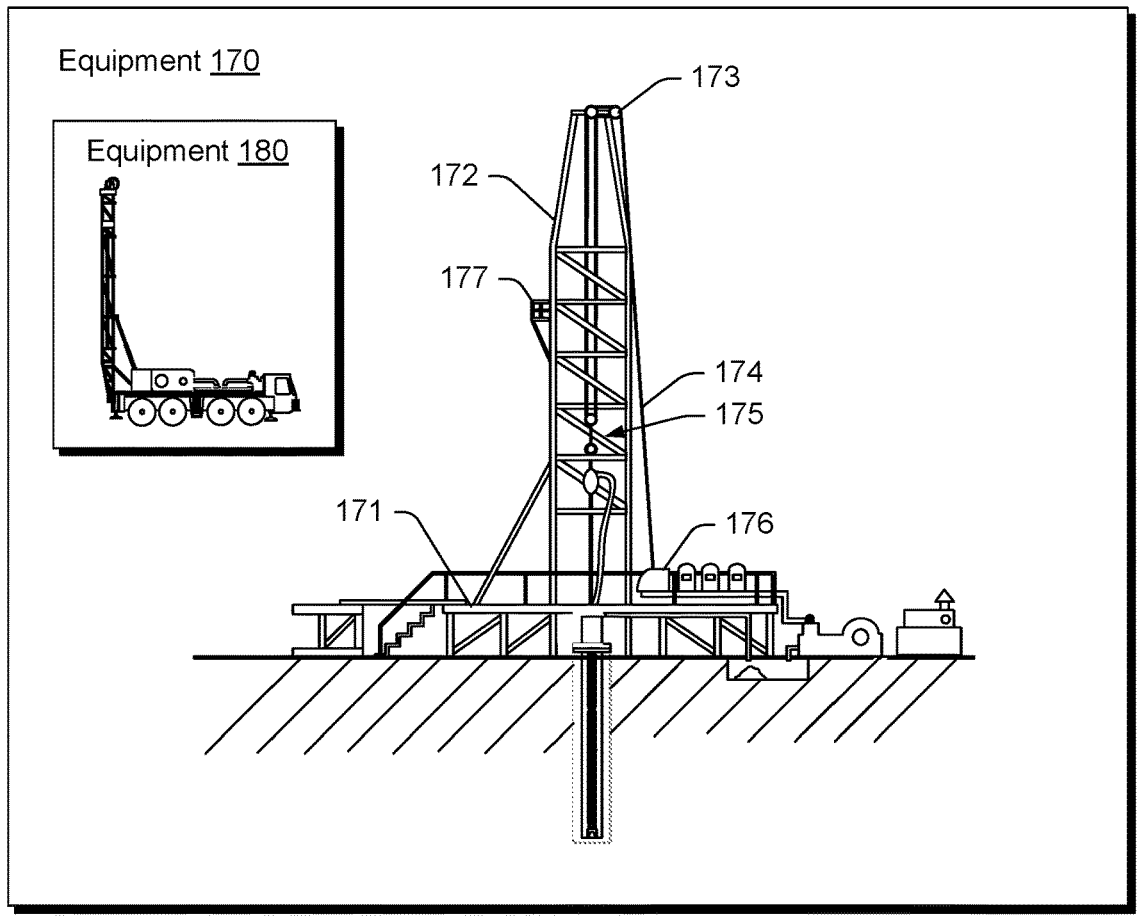

FIG. 1 shows an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with any of a variety of sensors, detectors, actuators, etc. For example, equipment 122 may include communication circuitry to receive and to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, geolocation, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, injection, production, etc. As an example, the equipment 127 and/or 128 may provide for measurement, collection, communication, storage, analysis, etc. of data such as, for example, production data (e.g., for one or more produced resources). As an example, one or more satellites may be provided for purposes of communications, data acquisition, etc.

FIG. 1 also shows an example of equipment 170 and an example of equipment 180. Such equipment, which may be systems of components, may be suitable for use in the geologic environment 120. While the equipment 170 and 180 are illustrated as land-based, various components may be suitable for use in an offshore system.

The equipment 170 includes a platform 171, a derrick 172, a crown block 173, a line 174, a traveling block assembly 175, drawworks 176 and a landing 177 (e.g., a monkeyboard). As an example, the line 174 may be controlled at least in part via the drawworks 176 such that the traveling block assembly 175 travels in a vertical direction with respect to the platform 171. For example, by drawing the line 174 in, the drawworks 176 may cause the line 174 to run through the crown block 173 and lift the traveling block assembly 175 skyward away from the platform 171; whereas, by allowing the line 174 out, the drawworks 176 may cause the line 174 to run through the crown block 173 and lower the traveling block assembly 175 toward the platform 171. Where the traveling block assembly 175 carries pipe (e.g., casing, etc.), tracking of movement of the traveling block 175 may provide an indication as to how much pipe has been deployed.

A derrick can be a structure used to support a crown block and a traveling block operatively coupled to the crown block at least in part via line. A derrick may be pyramidal in shape and offer a suitable strength-to-weight ratio. A derrick may be movable as a unit or in a piece by piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line can cause a traveling block (e.g., and whatever may be hanging underneath it), to be lowered into or raised out of a bore. Reeling out of line may be powered by gravity and reeling in by a motor, an engine, etc. (e.g., an electric motor, a diesel engine, etc.).

As an example, a crown block can include a set of pulleys (e.g., sheaves) that can be located at or near a top of a derrick or a mast, over which line is threaded. A traveling block can include a set of sheaves that can be moved up and down in a derrick or a mast via line threaded in the set of sheaves of the traveling block and in the set of sheaves of a crown block. A crown block, a traveling block and a line can form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

As an example, a derrick person may be a rig crew member that works on a platform attached to a derrick or a mast. A derrick can include a landing on which a derrick person may stand. As an example, such a landing may be about 10 meters or more above a rig floor. In an operation referred to as trip out of the hole (TOH), a derrick person may wear a safety harness that enables leaning out from the work landing (e.g., monkeyboard) to reach pipe in located at or near the center of a derrick or a mast and to throw a line around the pipe and pull it back into its storage location (e.g., fingerboards), for example, until it a time at which it may be desirable to run the pipe back into the bore. As an example, a rig may include automated pipe-handling equipment such that the derrick person controls the machinery rather than physically handling the pipe.

As an example, a trip may refer to the act of pulling equipment from a bore and/or placing equipment in a bore. As an example, equipment may include a drillstring that can be pulled out of the hole and/or place or replaced in the hole. As an example, a pipe trip may be performed where a drill bit has dulled or has otherwise ceased to drill efficiently and is to be replaced.

Figure 2:
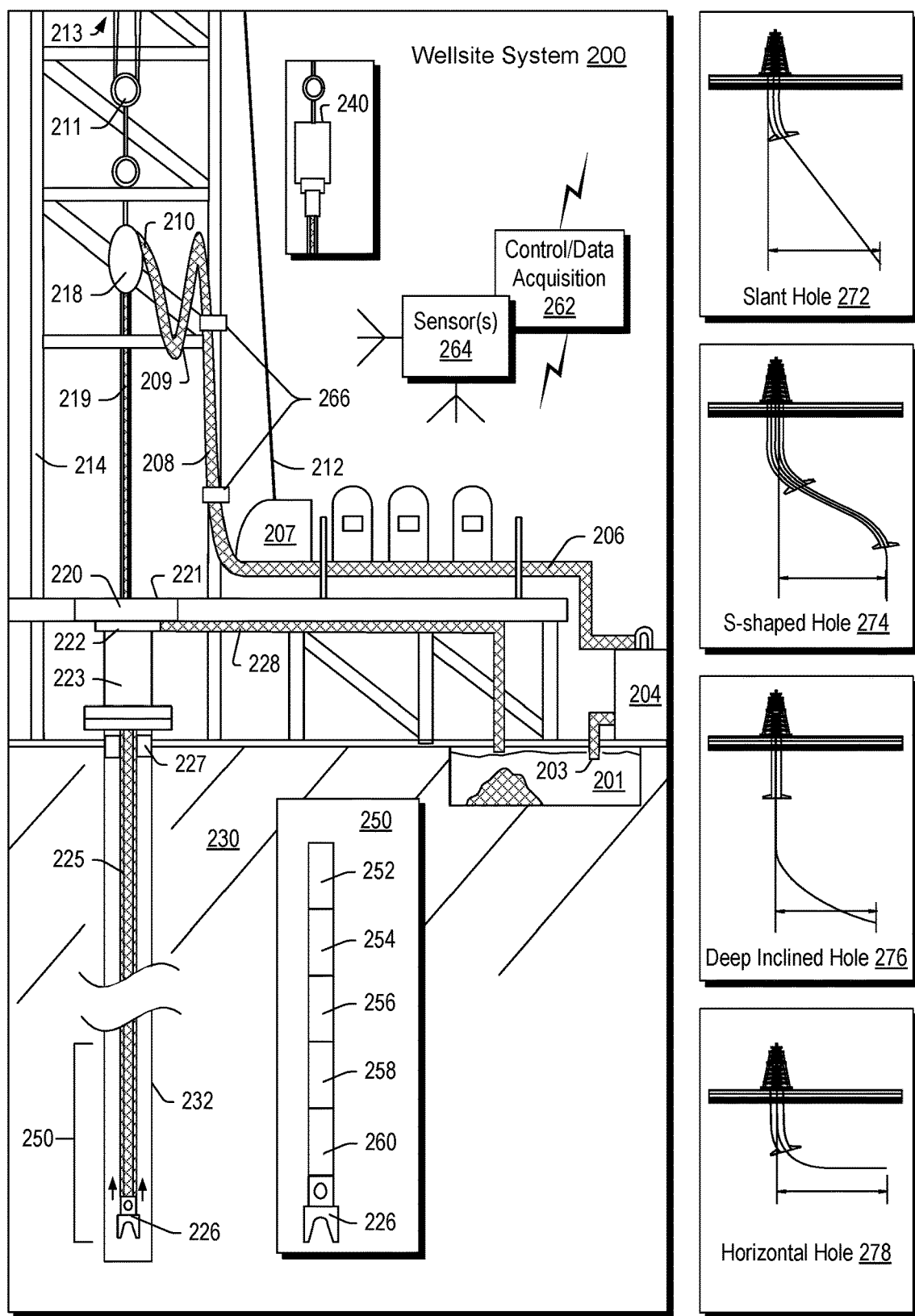
FIG. 2 illustrates an example of a system and examples of types of holes.

FIG. 2 shows an example of a wellsite system 200 (e.g., at a wellsite that may be onshore or offshore). As shown, the wellsite system 200 can include a mud tank 201 for holding mud and other material, a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212 (see, e.g., the crown block 173 of FIG. 1), a derrick 214 (see, e.g., the derrick 172 of FIG. 1), a kelly 218 or a top drive 240, a kelly drive bushing 219, a rotary table 220, a drill floor 221, a bell nipple 222, one or more blowout preventors (BOPs) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use directional drilling.

As shown in the example of FIG. 2, the drillstring 225 is suspended within the borehole 232 and has a drillstring assembly 250 that includes the drill bit 226 at its lower end. As an example, the drillstring assembly 250 may be a bottom hole assembly (BHA).

The wellsite system 200 system can provide for operation of the drillstring 225 and other operations. As shown, the wellsite system 200 includes the platform 211 and the derrick 214 positioned over the borehole 232. As mentioned, the wellsite system 200 can include the rotary table 220 where the drillstring 225 pass through an opening in the rotary table 220.

As shown, the wellsite system 200 can include the kelly 218 and associated components, etc., or a top drive 240 and associated components. As to a kelly example, the kelly 218 may be a square or hexagonal metal/alloy bar with a hole drilled therein that serves as a mud flow path. The kelly 218 can be used to transmit rotary motion from the rotary table 220 via the kelly drive bushing 219 to the drillstring 225, while allowing the drillstring 225 to be lowered or raised during rotation. The kelly 218 can pass through the kelly drive bushing 219, which can be driven by the rotary table 220. As an example, the rotary table 220 can include a master bushing that operatively couples to the kelly drive bushing 219 such that rotation of the rotary table 220 can turn the kelly drive bushing 219 and hence the kelly 218. The kelly drive bushing 219 can include an inside profile matching an outside profile (e.g., square, hexagonal, etc.) of the kelly 218; however, with slightly larger dimensions so that the kelly 218 can freely move up and down inside the kelly drive bushing 219.

As to a top drive example, the top drive 240 can provide functions performed by a kelly and a rotary table. The top drive 240 can turns the drillstring 225. As an example, the top drive 240 can include one or more motors (e.g., electric and/or hydraulic) connected with appropriate gearing to a short section of pipe called a quill, that in turn may be screwed into a saver sub or the drillstring 225 itself. The top drive 240 can be suspended from the traveling block 211, so the rotary mechanism is free to travel up and down the derrick 214. As an example, a top drive 240 may allow for drilling to be done with more joint stands than a kelly/rotary table approach.

In the example of FIG. 2, the mud tank 201 can hold mud, which can be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via a the lines 206, 208 and 209 to a port of the kelly 218 or, for example, to a port of the top drive 240. The mud can then flow via a passage (e.g., or passages) in the drillstring 225 and out of ports located on the drill bit 226 (see, e.g., a directional arrow). As the mud exits the drillstring 225 via ports in the drill bit 226, it can then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drill string 225 may be pulled from a wellbore and optionally replaced, for example, with a new or sharpened drill bit, a smaller diameter drill string, etc. As mentioned, the act of pulling a drill string out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drill string 225 at a bottom of a wellbore, pumping of the mud commences to lubricate the drill bit 226 for purposes of drilling to enlarge the wellbore. As mentioned, the mud can be pumped by the pump 204 into a passage of the drillstring 225 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 225) may be transmitted uphole to an uphole device, which may relay such information to other equipment for processing, control, etc.

As an example, telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

As an example, the drillstring 225 may be fitted with telemetry equipment 252 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measuring-while-drilling (MWD) module 256, an optional module 258, a roto-steerable system and motor 260, and the drill bit 226.

The LWD module 254 may be housed in a suitable type of drill collar and can contain one or a plurality of selected types of logging tools. It will also be understood that more than one LWD and/or MWD module can be employed, for example, as represented at by the module 256 of the drillstring assembly 250. Where the position of an LWD module is mentioned, as an example, it may refer to a module at the position of the LWD module 254, the module 256, etc. An LWD module can include capabilities for measuring, processing, and storing information, as well as for communicating with the surface equipment. In the illustrated example, the LWD module 254 may include a seismic measuring device.

The MWD module 256 may be housed in a suitable type of drill collar and can contain one or more devices for measuring characteristics of the drillstring 225 and the drill bit 226. As an example, the MWD tool 254 may include equipment for generating electrical power, for example, to power various components of the drillstring 225. As an example, the MWD tool 254 may include the telemetry equipment 252, for example, where the turbine impeller can generate power by flow of the mud; it being understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

FIG. 2 also shows some examples of types of holes that may be drilled. For example, consider a slant hole 272, an S-shaped hole 274, a deep inclined hole 276 and a horizontal hole 278.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (AND) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 can include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 can be provided for tracking pipe, tracking movement of at least a portion of a drillstring, etc.

As an example, the system 200 can include one or more sensors 266 that can sense and/or transmit signals to a fluid conduit such as a drilling fluid conduit (e.g., a drilling mud conduit). For example, in the system 200, the one or more sensors 266 can be operatively coupled to portions of the standpipe 208 through which mud flows. As an example, a downhole tool can generate pulses that can travel through the mud and be sensed by one or more of the one or more sensors 266. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 can include a transmitter that can generate signals that can be transmitted downhole via mud (e.g., drilling fluid) as a transmission medium.

As an example, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", the can refer to a portion of a drillstring that cannot be rotated or moved axially. As an example, a condition referred to as "differential sticking" can be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking can have time and financial cost.

As an example, a sticking force can be a product of the differential pressure between the wellbore and the reservoir and the area that the differential pressure is acting upon. This means that a relatively low differential pressure (delta p) applied over a large working area can be just as effective in sticking pipe as can a high differential pressure applied over a small area.

As an example, a condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings in the annulus.

As an example, a stick and slip scenario can occur for a tool (e.g., a toolstring, etc.) where, for example, it becomes stuck at some point and then releases. As an example, sticking can be due to one or more factors such as, for example, differential pressure or an irregular hole. Where force is applied, a tool may be freed, at which time it tends to move, or slip, which may occur relatively quickly. Where a tool provides measurements that may be associated with depth, as an example, readings opposite a zone of stick and slip may be displayed at inappropriate depths. And, as an example, as individual measurements can have their own respective measure points, a zone of stick and slip may show up at different depths as to individual measurements.

Figure 3:
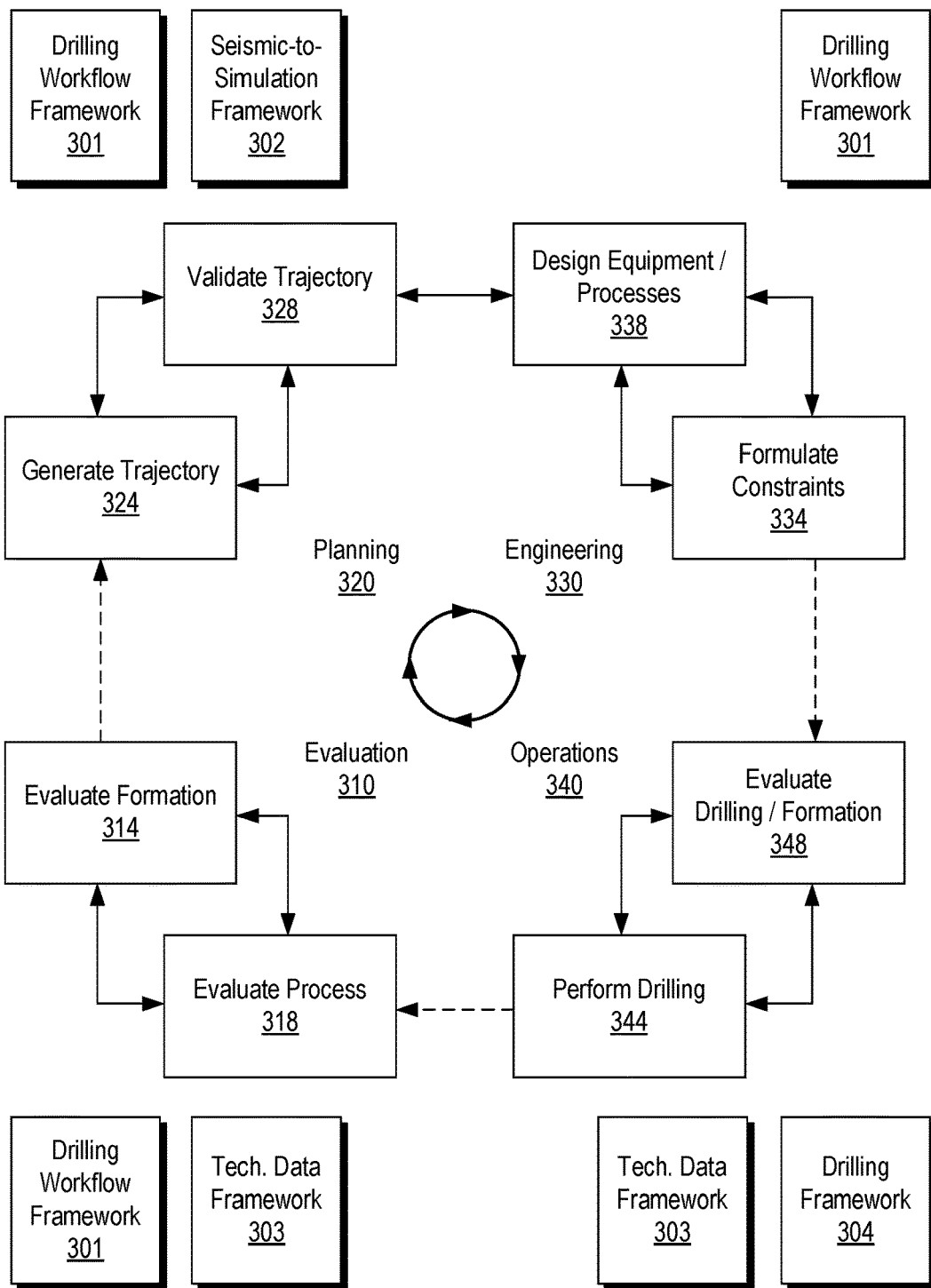
FIG. 3 illustrates an example of a system.

FIG. 3 shows an example of a system 300 that includes various equipment for evaluation 310, planning 320, engineering 330 and operations 340. For example, a drilling workflow framework 301, a seismic-to-simulation framework 302, a technical data framework 303 and a drilling framework 304 may be implemented to perform one or more processes such as a evaluating a formation 314, evaluating a process 318, generating a trajectory 324, validating a trajectory 328, formulating constraints 334, designing equipment and/or processes based at least in part on constraints 338, performing drilling 344 and evaluating drilling and/or formation 348.

In the example of FIG. 3, the seismic-to-simulation framework 302 can be, for example, the PETREL® framework (Schlumberger Limited, Houston, Tex.) and the technical data framework 302 can be, for example, the TECHLOG® framework (Schlumberger Limited, Houston, Tex.).

As an example, a framework can include entities that may include earth entities, geological objects or other objects such as wells, surfaces, reservoirs, etc. Entities can include virtual representations of actual physical entities that are reconstructed for purposes of one or more of evaluation, planning, engineering, operations, etc.

Entities may include entities based on data acquired via sensing, observation, etc. (e.g., seismic data and/or other information). An entity may be characterized by one or more properties (e.g., a geometrical pillar grid entity of an earth model may be characterized by a porosity property). Such properties may represent one or more measurements (e.g., acquired data), calculations, etc.

A framework may be an object-based framework. In such a framework, entities may include entities based on predefined classes, for example, to facilitate modeling, analysis, simulation, etc. A commercially available example of an object-based framework is the MICROSOFT™.NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

As an example, a framework can include an analysis component that may allow for interaction with a model or model-based results (e.g., simulation results, etc.). As to simulation, a framework may operatively link to or include a simulator such as the ECLIPSE® reservoir simulator (Schlumberger Limited, Houston Tex.), the INTERSECT® reservoir simulator (Schlumberger Limited, Houston Tex.), etc.

The aforementioned PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, well engineers, reservoir engineers, etc.) can develop collaborative workflows and integrate operations to streamline processes. Such a framework may be considered an application and may be considered a data-driven application (e.g., where data is input for purposes of modeling, simulating, etc.).

As an example, one or more frameworks may be interoperative and/or run upon one or another. As an example, consider the commercially available framework environment marketed as the OCEAN® framework environment (Schlumberger Limited, Houston, Tex.), which allows for integration of add-ons (or plug-ins) into a PETREL® framework workflow. The OCEAN® framework environment leverages .NET™ tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

As an example, a framework can include a model simulation layer along with a framework services layer, a framework core layer and a modules layer. The framework may include the commercially available OCEAN® framework where the model simulation layer can include or operatively link to the commercially available PETREL® model-centric software package that hosts OCEAN® framework applications. In an example embodiment, the PETREL® software may be considered a data-driven application. The PETREL® software can include a framework for model building and visualization. Such a model may include one or more grids.

As an example, the model simulation layer may provide domain objects, act as a data source, provide for rendering and provide for various user interfaces. Rendering may provide a graphical environment in which applications can display their data while the user interfaces may provide a common look and feel for application user interface components.

As an example, domain objects can include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g., to display the well as part of a model).

As an example, data may be stored in one or more data sources (or data stores, generally physical data storage devices), which may be at the same or different physical sites and accessible via one or more networks. As an example, a model simulation layer may be configured to model projects. As such, a particular project may be stored where stored project information may include inputs, models, results and cases. Thus, upon completion of a modeling session, a user may store a project. At a later time, the project can be accessed and restored using the model simulation layer, which can recreate instances of the relevant domain objects.

As an example, the system 300 may be used to perform one or more workflows. A workflow may be a process that includes a number of worksteps. A workstep may operate on data, for example, to create new data, to update existing data, etc. As an example, a workflow may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable at least in part in the PETREL® software, for example, that operates on seismic data, seismic attribute(s), etc. As an example, a workflow may be a process implementable at least in part in the OCEAN® framework. As an example, a workflow may include one or more worksteps that access a module such as a plug-in (e.g., external executable code, etc.).

As an example, a framework may provide for modeling petroleum systems. For example, the commercially available modeling framework marketed as the PETROMOD® framework (Schlumberger Limited, Houston, Tex.) includes features for input of various types of information (e.g., seismic, well, geological, etc.) to model evolution of a sedimentary basin. The PETROMOD® framework provides for petroleum systems modeling via input of various data such as seismic data, well data and other geological data, for example, to model evolution of a sedimentary basin. The PETROMOD® framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL® framework, workflows may be constructed to provide basin-to-prospect scale exploration solutions. Data exchange between frameworks can facilitate construction of models, analysis of data (e.g., PETROMOD® framework data analyzed using PETREL® framework capabilities), and coupling of workflows.

As mentioned, a drillstring can include various tools that may make measurements. As an example, a wireline tool or another type of tool may be utilized to make measurements. As an example, a tool may be configured to acquire electrical borehole images. As an example, the fullbore Formation MicroImager (FMI) tool (Schlumberger Limited, Houston, Tex.) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

Analysis of formation information may reveal features such as, for example, vugs, dissolution planes (e.g., dissolution along bedding planes), stress-related features, dip events, etc. As an example, a tool may acquire information that may help to characterize a reservoir, optionally a fractured reservoir where fractures may be natural and/or artificial (e.g., hydraulic fractures). As an example, information acquired by a tool or tools may be analyzed using a framework such as the TECHLOG® framework. As an example, the TECHLOG® framework can be interoperable with one or more other frameworks such as, for example, the PETREL® framework.

Figure 4:
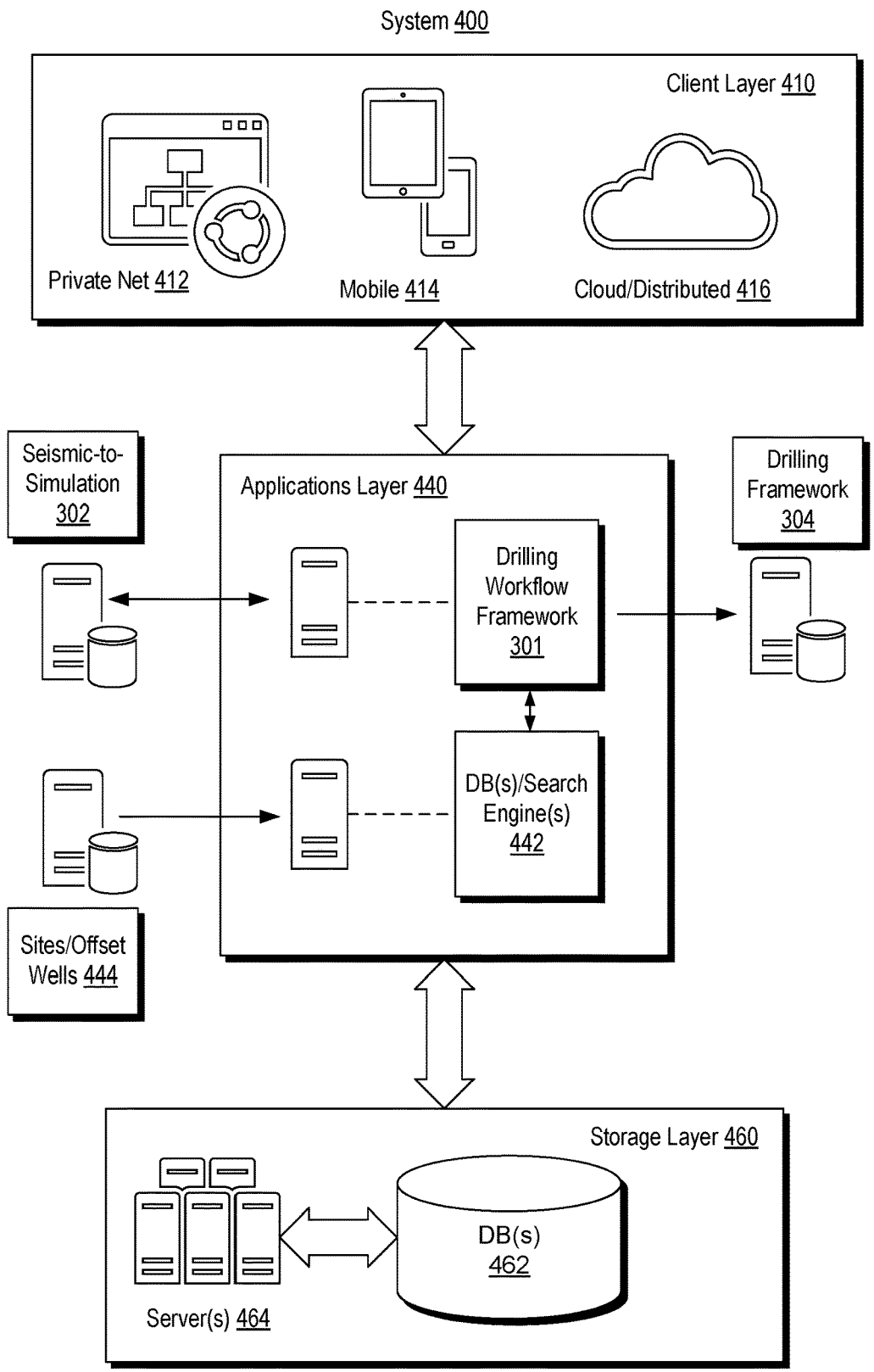
FIG. 4 illustrates an example of a system.

FIG. 4 shows an example of a system 400 that includes a client layer 410, an applications layer 440 and a storage layer 460. As shown the client layer 410 can be in communication with the applications layer 440 and the applications layer 440 can be in communication with the storage layer 460.

The client layer 410 can include features that allow for access and interactions via one or more private networks 412, one or more mobile platforms and/or mobile networks 414 and via the "cloud" 416, which may be considered to include distributed equipment that forms a network such as a network of networks.

In the example of FIG. 4, the applications layer 440 includes the drilling workflow framework 301 as mentioned with respect to the example of FIG. 3. The applications layer 440 also includes a database management component 442 that includes one or more search engines modules.

As an example, the database management component 442 can include one or more search engine modules that provide for searching one or more information that may be stored in one or more data repositories. As an example, the STUDIO E&P™ knowledge environment (Schlumberger Ltd., Houston, Tex.) includes STUDIO FIND™ search functionality, which provides a search engine. The STUDIO FIND™ search functionality also provides for indexing content, for example, to create one or more indexes. As an example, search functionality may provide for access to public content, private content or both, which may exist in one or more databases, for example, optionally distributed and accessible via an intranet, the Internet or one or more other networks. As an example, a search engine may be configured to apply one or more filters from a set or sets of filters, for example, to enable users to filter out data that may not be of interest.

As an example, framework may provide for interaction with a search engine and, for example, associated features such as features of the STUDIO FINDIM search functionality. As an example, a framework may provide for implementation of one or more spatial filters (e.g., based on an area viewed on a display, static data, etc.). As an example, a search may provide access to dynamic data (e.g., "live" data from one or more sources), which may be available via one or more networks (e.g., wired, wireless, etc.). As an example, one or more modules may optionally be implemented within a framework or, for example, in a manner operatively coupled to a framework (e.g., as an add-on, a plug-in, etc.). As an example, a module for structuring search results (e.g., in a list, a hierarchical tree structure, etc.) may optionally be implemented within a framework or, for example, in a manner operatively coupled to a framework (e.g., as an add-on, a plug-in, etc.).

In the example of FIG. 4, the applications layer 440 can include communicating with one or more resources such as, for example, the seismic-to-simulation framework 302, the drilling framework 304 and/or one or more sites, which may be or include one or more offset wellsites. As an example, the applications layer 440 may be implemented for a particular wellsite where information can be processed as part of a workflow for operations such as, for example, operations performed, being performed and/or to be performed at the particular wellsite. As an example, an operation may involve directional drilling, for example, via geosteering.

In the example of FIG. 4, the storage layer 460 can include various types of data, information, etc., which may be stored in one or more databases 462. As an example, one or more servers 464 may provide for management, access, etc., to data, information, etc., stored in the one or more databases 462. As an example, the module 442 may provide for searching as to data, information, etc., stored in the one or more databases 462.

As an example, the module 442 may include features for indexing, etc. As an example, information may be indexed at least in part with respect to wellsite. For example, where the applications layer 440 is implemented to perform one or more workflows associated with a particular wellsite, data, information, etc., associated with that particular wellsite may be indexed based at least in part on the wellsite being an index parameter (e.g., a search parameter).

As an example, the system 400 of FIG. 4 may be implemented to perform one or more portions of one or more workflows associated with the system 300 of FIG. 3. For example, the drilling workflow framework 301 may interact with the technical data framework 303 and the drilling framework 304 before, during and/or after performance of one or more drilling operations. In such an example, the one or more drilling operations may be performed in a geologic environment (see, e.g., the environment 150 of FIG. 1) using one or more types of equipment (see, e.g., equipment of FIGS. 1 and 2).

As an example, a method can include acquiring information, analyzing at least a portion of the information and configuring and/or operating equipment based at least in part on such analyzing. For example, a method can include configuring a sensor of a toolstring and/or operating at least one component of a toolstring. Such an approach may aim to optimize a sensor or sensor configurations and/or optimize component or components operations. As an example, a method may operate in one or more modes such as, for example, an open loop mode, a control loop mode or other type of mode. As an example, a component of a toolstring, which may be a drillstring, may be referred to as a "sub".

As an example, a method can include drilling modeling based at least in part on information received from one or more pieces of equipment. As an example, a method can include drilling modeling based at least in part on data from one or more dynamic sub components, one or more rig surface components, one or more MWD components, one or more LWD components, one or more trajectory surveys, one or more formation assessments, etc.

As an example, a toolstring can include at least one dynamic sub that can acquire measurements. In such an example, a measurement or measurements may be used in a process to validate a dynamic simulation model. For example, consider a dynamic model that provides one or more dynamic parameters for a plurality of individual components along a drillstring.

As an example, a dynamic parameter may be a parameter associated with, for example, one or more of force, torque, moment, movement, trajectory and weight. As an example, a dynamic issue may be an issue associated with, for example, one or more of force, torque, moment, movement, trajectory and weight. As an example, a dynamic issue may be a sticking issue, a slipping issue, etc. As an example, a rotational issue may be an issue associated with rotation of a drillstring (e.g., vibration, bending, lengthening, sticking, slipping, etc.). As an example, as a drillstring that includes a bit involves rotation to advance the bit, a rotational issue may be an issue associated with advancement of a bit. As an example, a rotational issue may be an issue associated with retraction of a toolstring, for example, where movement is in an uphole direction, which may occur from time-to-time during an operation or which may occur upon withdrawal of a toolstring (e.g., an uphole trip, etc.). As an example, a rotational issue may be an issue associated with insertion of a toolstring, for example, where movement is in a downhole direction (e.g., a downhole trip, etc.), which can include advance of the toolstring via drilling (e.g., rotation of a bit of the toolstring).

As an example, a method can include combining, via a dynamic model, various combinations of data, which may include, for example, one or more of drilling rig surface data, LWD/MWD/downhole dynamics measurement data, trajectory surveys and formation information for drilling operation.

As an example, a method can help optimize drill operation, downhole tool control and/or bottom hole assembly (BHA) setup. For example, consider a method that can be implemented as a post-run analysis for in-depth understanding of downhole drilling performance and drilling efficiency improvement. As another example, consider a method that can be implemented in real-time (RT) as a surface drilling performance monitoring and supervision system. In such an example, based at least in part on RT simulation, drilling performance can be improved effectively by tuning drilling parameters with the understanding of the downhole drilling dynamics. As yet another example, a method can be implemented in real-time as a downhole drilling performance monitoring and supervision system. In such an example, based at least in part on RT simulation, drilling performance can be improved effectively by tuning drilling parameters directly through inter-tool communication with the understanding of the downhole drilling dynamics. As an example, a method may provide for various modes of operation.

As an example, a system may be utilized to implement one or more methods. As an example, such a system may be used for one or more types of drilling and/or remedial applications. For example, consider one or more of drilling, case milling, plug milling, well departure, and well abandonment.

As an example, to measure drilling dynamic performance, a method can include configuring a drillstring with one or more downhole dynamic subs. As an example, a dynamic sub can be a tool that measures one or more types of downhole dynamics, which may be related to performance of one or more components of a drillstring (e.g., vibration, RPM, etc.). As an example, one or more dynamic subs can acquire information as to a BHA/bit's dynamic response, optionally at a relatively high frequency. Depending on transmission system capabilities (e.g., telemetry capabilities), high frequency data may be unavailable in a real-time manner, for example, even when reduced (e.g., thinned, compressed, etc.). As an example, such high frequency data may be stored in memory of a component where the data can be read from the memory of the component after the component is retrieved (e.g., post-job) via tripping out the toolstring to which the component is a member thereof. As an example, one or more subs may be operatively coupled to telemetry equipment to transmit relatively low frequency, real-time data to a surface piece of equipment, for example, to perform an in-situ type of analysis. As an example, a toolstring may provide some flexibility in configuration. For example, a sub may be locatable at one or more positions along a BHA. As an example, a toolstring can be characterized by a number of components and an order of components, which may be a linear order (e.g., a serial order). As an example, an order of components may be characterized by position along a long axis of a toolstring. As an example, where a toolstring is a drillstring, at last component can be a drill bit (e.g., a bit). As an example, an order may be referenced from an uphole end downward or from a downhole end upward (e.g., where a bit may be considered to be component 1).

Figure 5:
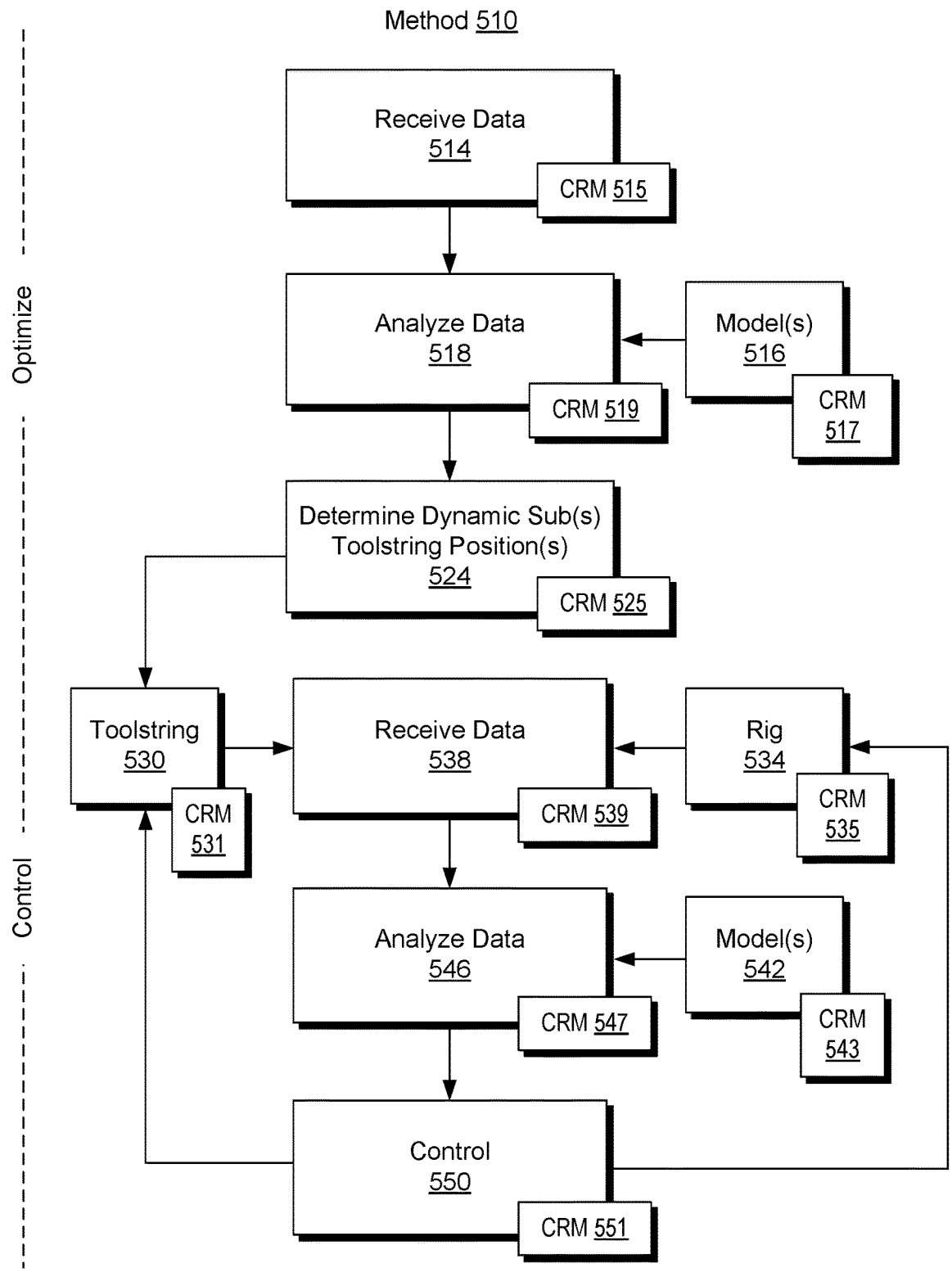
FIG. 5 illustrates an example of a method.

FIG. 5 shows an example of a method 510 that includes a reception block 514 for receiving data, a model block 516 that can provide one or more models, an analysis block 518 for analyzing at least a portion of the data based at least in part on one or more models of the model block 516, and a determination block 524 for determining one or more positions for one or more dynamic subs for a toolstring. As an example, a dynamic sub can be a component that includes one or more sensors. As an example, a dynamic sub can be a vibration measurement dynamic sub that can measure at least vibration of at least a portion of a toolstring to which the sub is a part thereof.

As shown in the example of FIG. 5, the method 510 can include a toolstring block 530 for building and/or otherwise providing a toolstring. In such an example, the toolstring can include one or more dynamic subs that may, for example, be positioned according to one or more positions determined by the determination block 524.

As shown in the example of FIG. 5, the method 510 can include a reception block 538 for receiving data acquired via a sensor of a component of a plurality of components arranged in an order at respective axial positions of a toolstring, an analysis block 546 for analyzing at least a portion of the data with respect to a model of the toolstring to generate results; and a control block 550 for controlling the toolstring based at least in part on the results.

In the example of FIG. 5, the reception block 538 can include receiving information via the toolstring block 530 and/or a rig block 535. As an example, a model block 542 can provide one or more models where, for example, the analysis block 546 can provide for analyzing at least a portion of the data based at least in part on one or more models of the model block 542. As an example, the model block 516 and the model block 542 can include models that include dynamic parameters. For example, a dynamic parameter may correspond at least in part to a dynamic physical phenomenon that can be sensed by a sensor of at least one component of a toolstring, which may include a bit (e.g., a drillstring).

The method 510 is shown in FIG. 5 in association with various computer-readable media (CRM) blocks 515, 517, 519, 525, 531, 535, 539, 543, 547, and 551. Such blocks generally include instructions suitable for execution by one or more processors (or cores) to instruct a computing device or system to perform one or more actions. While various blocks are shown, a single medium may be configured with instructions to allow for, at least in part, performance of various actions of the method 510. As an example, a computer-readable medium (CRM) may be a computer-readable storage medium. As an example, the blocks 515, 517, 519, 525, 531, 535, 539, 543, 547, and 551 may be provided as one or more modules, for example, such as the one or more modules and/or instructions 2502 of the system 2500 of FIG. 25.

Figure 6:
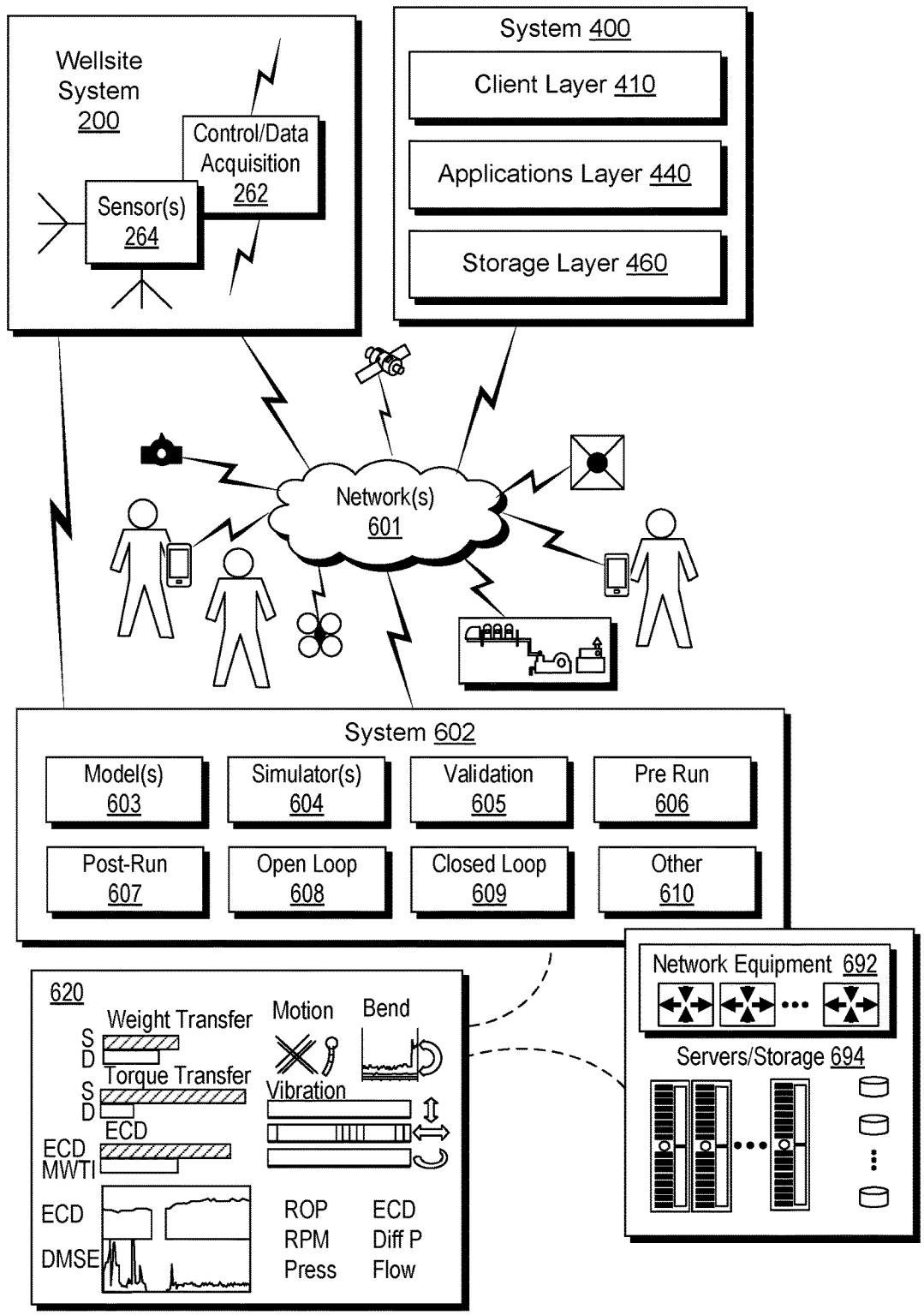
FIG. 6 illustrates an example of a wellsite system and an example of a system.

FIG. 6 shows an example of an architecture 600 that can include the wellsite system 200, the system 400 and a system 602 where the systems 200, 400 and 602 may be operatively coupled via one or more networks 601. As an example, the system 602 may be implemented in part via one or more pieces of equipment such as, for example, one or more pieces of computing equipment. As an example, the system 602 can include network equipment 692 and one or more servers and storage devices 694.

As an example, the architecture 600 can include one or more additional systems, for example, optionally as one or more sub-systems. As an example, a real-time drilling service system 620 may be operatively coupled to the system 602 (e.g., optionally via equipment 692, 694, etc.). In the example of FIG. 6, the real-time drilling service system 620 may provide information such as weight transfer information, torque transfer information, equivalent circulation density (ECD) information, downhole mechanical specific energy (DMSE) information, motion information (e.g., as to stall, stick-slip, etc.), bending information, vibrational amplitude information (e.g., axial, lateral and/or torsional), rate of penetration (ROP) information, pressure information, differential pressure information, flow information, etc. As an example, sensor information may include inclination, azimuth, total vertical depth, etc. As an example, a service may provide information as to whirl (e.g., backward whirl, etc.) and may optionally provide information such as one or more alerts (e.g., "severe backward whirl: stop and restart with lower surface RPM", etc.).

In the example of FIG. 6, the system 602 can include a model module 603, a simulator module 604, a validation module 605, a pre run module 606, a post run module 607, an open loop control module 608, a closed loop control module 609 and/or one or more other modules 610. As an example, the system 602 can be implemented to receive information from a wellsite system. As an example, the system 602 can be part of a wellsite system and/or implemented at least in part at a wellsite as part of a wellsite system.

Figure 7:
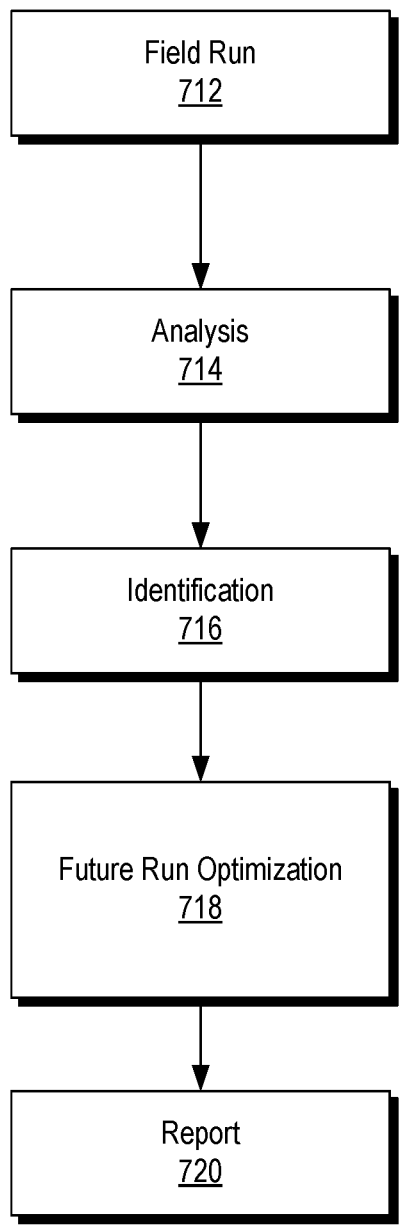
FIG. 7 illustrates example of methods.
Figure 7:
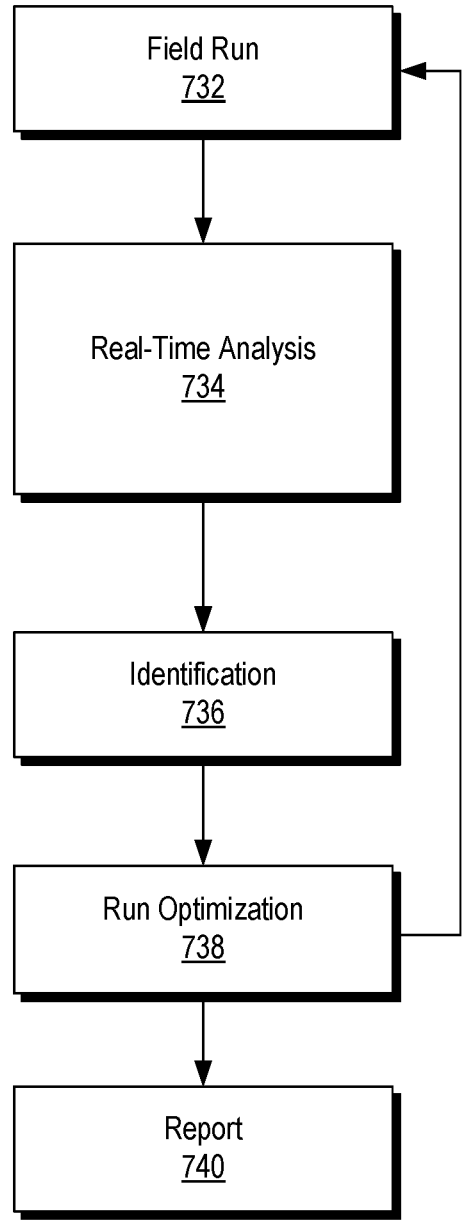

FIG. 7 shows an example of a post-run method 710 and an example of a real-time method 730, noting that real-time refers to actions such as acquiring, transmitting, analyzing and/or controlling where delays may be of the order of about minutes. For example, where a drillstring is utilized to drill a bore into a formation, a drillstring may progress at a rate referred to as a drilling rate. The drilling rate can be a speed at which the drill bit can break rock and thus deepen a bore. This speed may be reported, for example, in units of feet per hour, meters per hour, etc. As an example, a drilling rate may be a rate of penetration (ROP), for example, calculated by measuring a length of time to drill 1 foot of depth, 1 meter of depth, etc. As an example, a hard, compacted formation may tend to drill relatively slow and relatively consistently as to a ROP; whereas, a softer formation may tend to drill more quickly and may include a somewhat erratic ROP. As an example, consider a drilling rate of about 10 feet per hour or a ROP of about 6 minutes per foot. In such an example, a real-time process may be of the order of minutes such that one or more decisions (e.g., control actions, etc.) may be performed during drilling of a portion of a bore where the portion may be of the order of about one foot. As an example, a system may provide for real-time drilling control optionally on about a foot by foot basis.

As to drilling, one or more types of bits may be utilized. As an example, consider a roller-cone bit, a polycrystalline diamond compact (PDC) bit, an antiwhirl bit, etc.

A roller-cone bit includes conical cutters or cones that have spiked teeth around them. As a drillstring is rotated, bit cones roll along the bottom of a hole in a circle. As they roll, new teeth come in contact with the bottom of the hole, crushing the rock immediately below and around the bit tooth. As the cone rolls, the tooth then lifts off the bottom of the hole and a high-velocity fluid jet strikes the crushed rock chips to remove them from the bottom of the hole and up the annulus. As this occurs, another tooth makes contact with the bottom of the hole and creates new rock chips. Thus, the process of chipping the rock and removing the small rock chips with the fluid jets is continuous. The teeth intermesh on the cones, which helps clean the cones and enables larger teeth to be used.

As an example, an antiwhirl drill bit may be a PDC type. As an example, an antiwhirl bit can include individual cutting elements on the bit that create a net imbalance force. This imbalance force can push the bit against a side of a hole, which can help to create a stable rotating condition that resists backwards whirling, wobbling and downhole vibration. While antiwhirl is in the name, it can experience whirl (e.g., antiwhirl refers to an ability to reduce whirl).

In FIG. 7, the method 710 includes a run block 712 for performing a field run and acquiring field run information, an analysis block 714 for analyzing at least a portion of the field run information, an identification block 716 for identifying one or more field run conditions based at least in part on the analyzing, a run optimization block 718 for optimizing a future field run based at least in part on the identifying and a report block 720 for reporting, for example, outputting a report, etc.

In FIG. 7, the method 730 includes a run block 732 for performing a field run and acquiring field run information, a real-time analysis block 734 for analyzing at least a portion of the field run information in real-time, an identification block 736 for identifying one or more field run conditions based at least in part on the analyzing, a run optimization block 738 for optimizing the field run of the run block 732 based at least in part on the identifying and a report block 740 for reporting, for example, outputting a report, etc. As shown in the example method 730, a loop can exist between the run optimization block 738 and the run block 732 such that control may be performed of an ongoing run where further field run information is acquired, analyzed, etc.

As an example, the method 710 can be performed in a manner that provides for a post-run service that analyzes sub recorded high frequency downhole data where a result or results from such analysis or analyses may be applied to a future field run or, for example, merely reported (e.g., to a customer, etc.).

As an example, the method 730 can be performed in a manner that provides for a real-time service that includes analyzing sub transmitted real-time data. As illustrated, such a method may be applied in a sequence of field run, real-time data analysis, problem identification, operation optimization (e.g., feedback to field run operation control to optimize the drilling efficiency), and customer reporting.

As an example, the method 730 can include implementing one or more technologies. For example, consider one or more of OPTIDRILL™ and OPTILOG™ technologies (Schlumberger Limited, Houston, Tex.).

The OPTIDRILL™ technology can help to manage downhole conditions and BHA dynamics as a real-time drilling intelligence service. The service can incorporate a rigsite display of integrated downhole and surface data that provides actionable information to mitigate risk and increase efficiency. Such data can be simultaneously interpreted by remote experts, who may collaborate with a drilling team to improve performance. As an example, the real-time drilling service system 620 of FIG. 6 can include one or more features of the OPTIDRILL™ technology and/or one or more other features.

The OPTILOG™ technology can help to evaluate drilling system performance with single- or multiple-location measurements of drilling dynamics and internal temperature from a recorder. As an example, post-run data can be analyzed to provide input for future well planning. As an example, an OPTILOG™ BHA dynamics recorder may be included in a drillstring to provide post-run data to evaluate drilling system performance. In such an example, a recorder sub or recorder subs can be placed at one or more locations in a BHA for measurement of drilling dynamics and/or internal temperature. In such an example, post-run data from the recorder can be visualized, for example, via the PERFORM™ toolkit data optimization and analysis software (Schlumberger Limited, Houston, Tex.), for example, to provide input for well planning, etc.

As an example, dynamic sub technology can include circuitry that acquires measurements downhole, for example, measurements as to vibration. As an example, vibration information may be acquired at a suitable sampling rate such that one or more types of vibration may be sensed and characterized via analysis. As an example, consider a sensor and associated circuitry that can acquire data at a sampling rate of the order of about 100 Hz (e.g., or more or less). As an example, a sampling rate may be selected based at least in part on one or more types of vibrations (e.g., vibrational modes, etc.). As an example, a sampling rate may be selected based at least in part on a Nyquist theory (e.g., Nyquist frequency, Nyquist-Shannon theory, etc.).

As an example, a dynamic sub can include one or more sensors that can measure rotation speed and one or more sensors that can measure vibration (e.g., in an axial direction and one or more lateral directions). In such an example, the dynamic sub can include one or more sensors that can measure temperature. As an example, a dynamic sub can include circuitry that acquires and records data at one or more frequencies in a range of frequencies that may include a maximum frequency of the order of a kHz or more (e.g., consider 2 kHz).

As an example, a dynamic sub can include one or more power sources (e.g., a battery or batteries). As an example, a dynamic sub can include a mechanism that can generate energy that can power circuitry of the dynamic sub (e.g., via rotation of a drillstring, via heat transfer, via fluid flow, etc.).

As an example, a dynamic sub can include coupling that can be utilized to operatively couple the dynamic sub at a location in a drilling string. As an example, two dynamic subs may be operatively coupled to each other, for example, directly and/or via a dynamic sub to dynamic sub coupling segment. In such an example, a coupling segment may provide one or more sharable components such as, for example, a power source, memory, processor(s), transmission of information, etc.

As an example, a dynamic sub can be a bit sub that is specialized for placement in a toolstring adjacent to or proximate to a bit. In such an example, the dynamic sub can include circuitry that measures bit vibrations. In such an example, the dynamic sub can include a breaker slot, which may be positioned at or near an end of the dynamic sub that is closest to a bit. As an example, a dynamic sub can be a toolstring sub that can be positioned in a toolstring, for example, between other types of components where such components are not a bit. In such an example, the dynamic sub may be positioned in a drillstring, for example, to measure vibrations of one or more BHA components (e.g., at a distance from a bit). As an example, a dynamic sub can include one or more tongs, which may facilitate operatively coupling the dynamic sub to one or more other components of a toolstring (e.g., a drillstring).

As an example, a dynamic sub can include memory. As an example, a dynamic sub can include a processor (e.g., a microprocessor, microcontroller, etc.). As an example, a processor may be an ARM-based processor, a RISC-based processor, etc. As an example, a dynamic sub can include one or more interfaces, for example, one or more data transmission interfaces. As an example, data can include measurement data, processed data, instruction and/or command data, etc.

As to the example method 710 of FIG. 7, it may offer measurement at limited locations, measure limited dynamic parameters, provide a drilling performance analysis that may be somewhat subjective, uncertain and incomplete, may lack facility as to identification of a root cause for one or more measured drilling performance issues, and it may operate in a manner that is separated from one or more other downhole tools, such as LWD/MWD.

As an example, in comparison to the method 710, a method may allow for one or more of: providing more dynamic parameters measurements; providing measurements for a plurality of components in a BHA (see, e.g., an example scenario 830 of FIG. 8); generating in-depth, reliable and persuasive performance analysis; providing better cause analysis for drilling performance issues and helping to identify real cause to one or more observed issues; helping as to optimization of drilling performance and improving drilling efficiency effectively and accurately; integrating data from a variety of sources (e.g., via a unified system, etc.) where such data can include one or more of surface drilling rig sensor data, LWD/MWD/downhole dynamics measurement data, trajectory surveys and formation information; and performing pre run analysis, for example, to find an optimum dynamic sub placement to obtain desired measurement sensitivity and/or accuracy.

Figure 8:
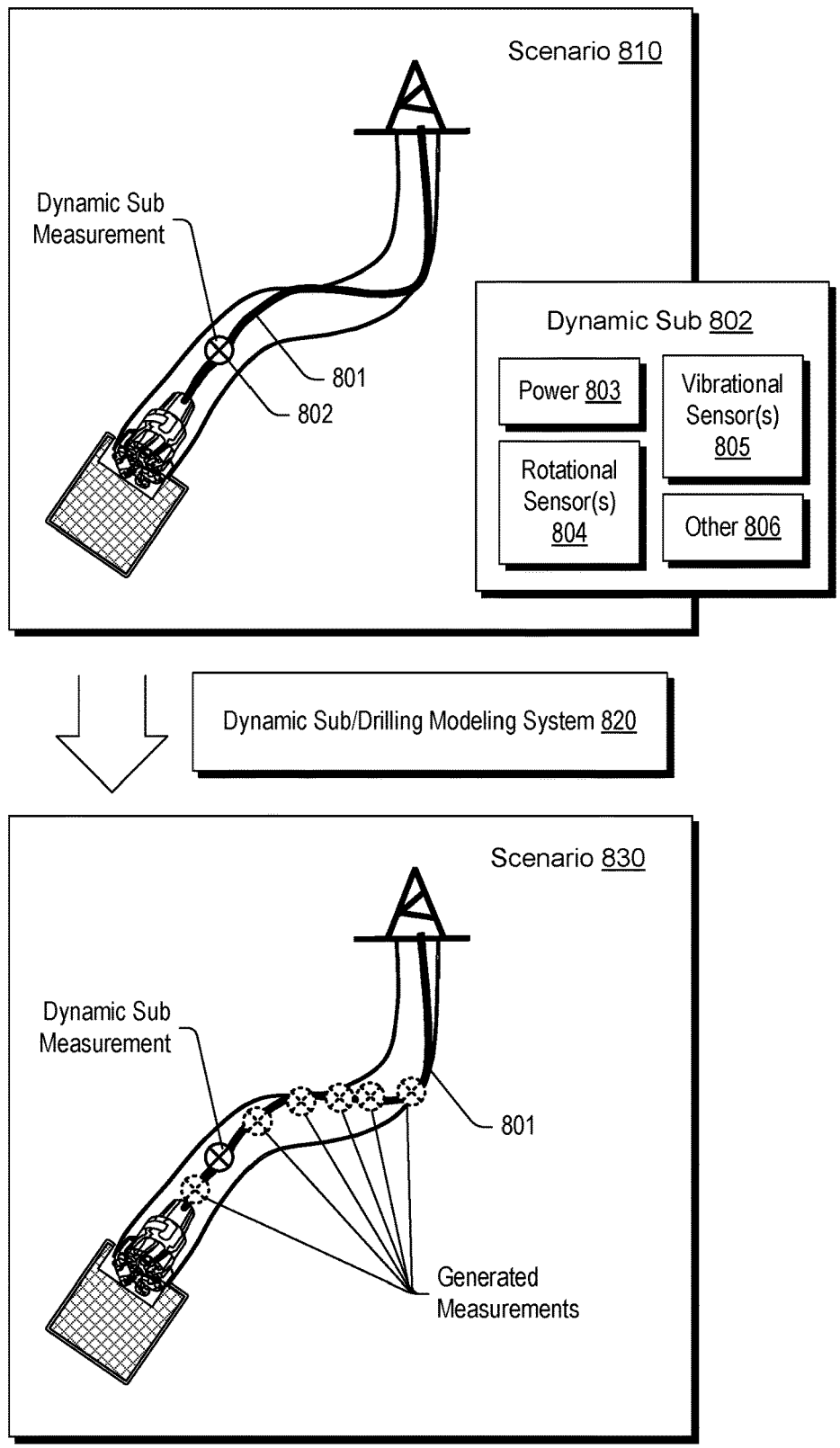
FIG. 8 illustrates examples of scenarios and an example of a system.

FIG. 8 shows an example of a toolstring 801 (e.g., a drillstring) that includes an example of a dynamic sub 802 where the toolstring 801 and dynamic sub 802 are illustrated in an example scenario 810 with respect to an example system 820 and the example scenario 830.

In the example of FIG. 8, the dynamic sub 802 can include a power supply 803, one or more rotational sensors 804, one or more vibrational sensors 805 and one or more other components 806. As an example, the dynamic sub 802 may be a vibration measurement dynamic sub that can measure at least vibration of a portion of the toolstring 801, for example, consider vibration associated with operation of the toolstring 801 to drill into a formation.

As shown in the scenario 810, the toolstring 801 can include the dynamic sub 802 as a dynamic sub measurement component. As an example, the system 820 can perform dynamic sub and drilling modeling in a manner where information acquired via one or more dynamic sub components are processed, for example, to provide for system generated measurements at one or more other positions of one or more other components that are part of the toolstring. As an example, the system 820 can operate in real-time. The scenario 830 illustrates examples of generated measurements that may be at one or more positions along the toolstring 801 where such generated measurements may be based at least in part on information acquired by the dynamic sub 802 (e.g., optionally information acquired by more than one dynamic sub).

Figure 9:
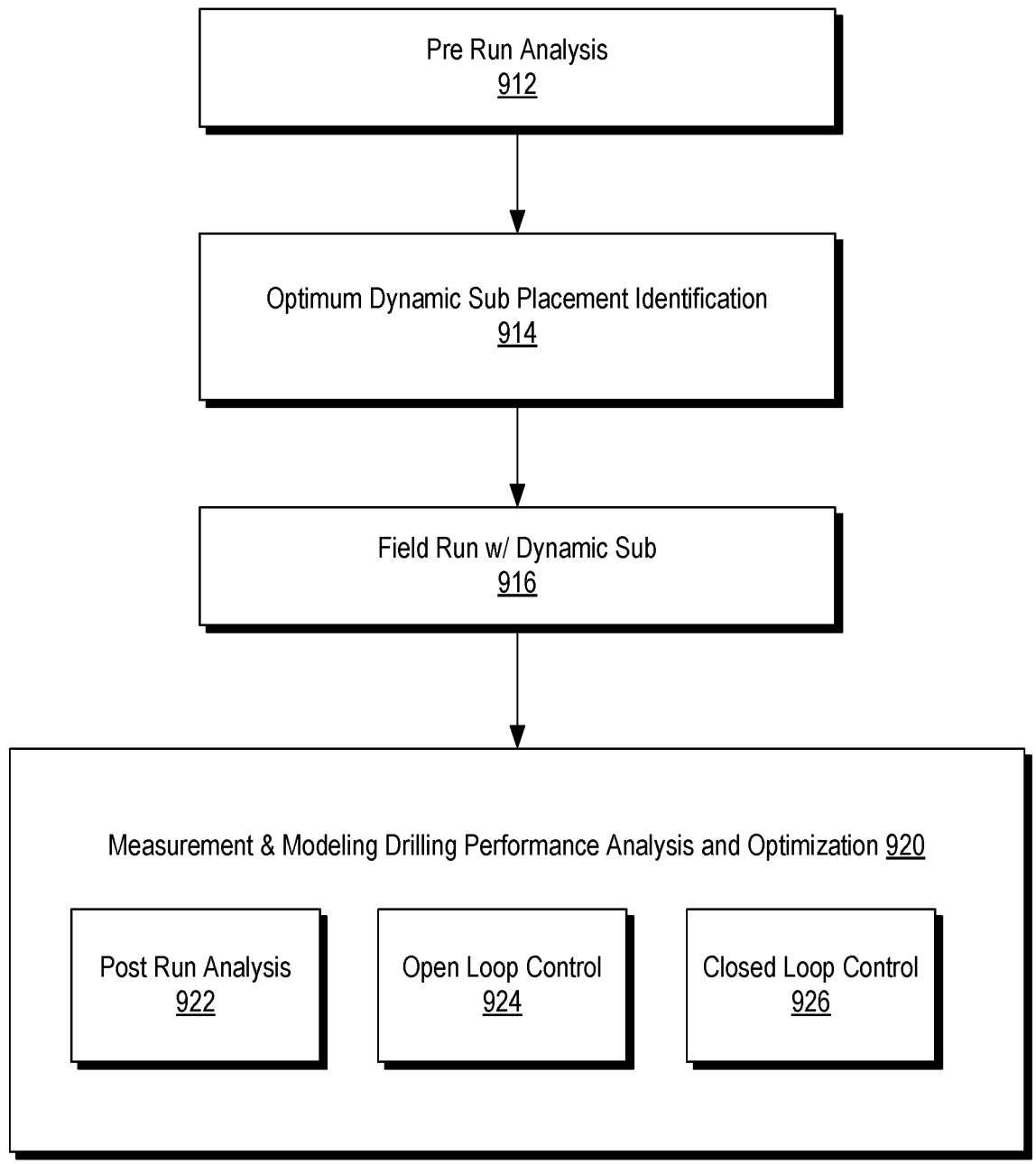
FIG. 9 illustrates an example of a method.

FIG. 9 shows an example of a method 910 that includes a pre run analysis block 912 for performing a pre run analysis, an optimization block for identification of an optimum dynamic sub placement or dynamic subs placements along a toolstring (e.g., order, spacing, neighbor, neighbors, etc.), a field run block 916 for performing a field run with the one or more placed dynamic subs and a measurement and modelling drilling performance analysis and optimization block 920 that can include a post run analysis block 922 for performing a post run analysis, an open loop control block 924 for performing open loop control during the field run of the field run block 916 and a closed loop control block 926 for performing closed loop control during the field run of the field run block 916.

As an example, a system may provide for implementation of the method 910 of FIG. 9. As an example, the method 910 may be implemented at least in part as a service. As an example, the method 910 may be implemented at least in part as a workflow.

As an example, a method can include performing a pre run analysis that helps to identify an optimum dynamic sub placement to increase measurement accuracy and sensitivity. In such an example, the dynamic sub can be appropriately placed and used in a field run where data are acquired and drilling performance is analyzed and optimized by a measurement and modeling system.

As an example, a measurement and modeling system can include various types of operational modes. For example, consider a post run analysis mode, an open loop control mode, and a closed loop control mode. Such modes may be implemented, for example, at least in part via processor-executable instructions that can be stored in memory of an information storage device. As an example, such instructions may be application instructions where an application is included in the system for each of the individual modes, which may be selectable via a graphical user interface and/or other types of input, commands, etc.

As an example, one or more of the aforementioned three types of applications may be classified based at least in part on dynamic sub capability of one or more dynamic subs and/or an automation level of a BHA and/or rig control. As an example, a method may implement one or more of the modes, optionally serially and/or at least in part in parallel.

Figure 10:
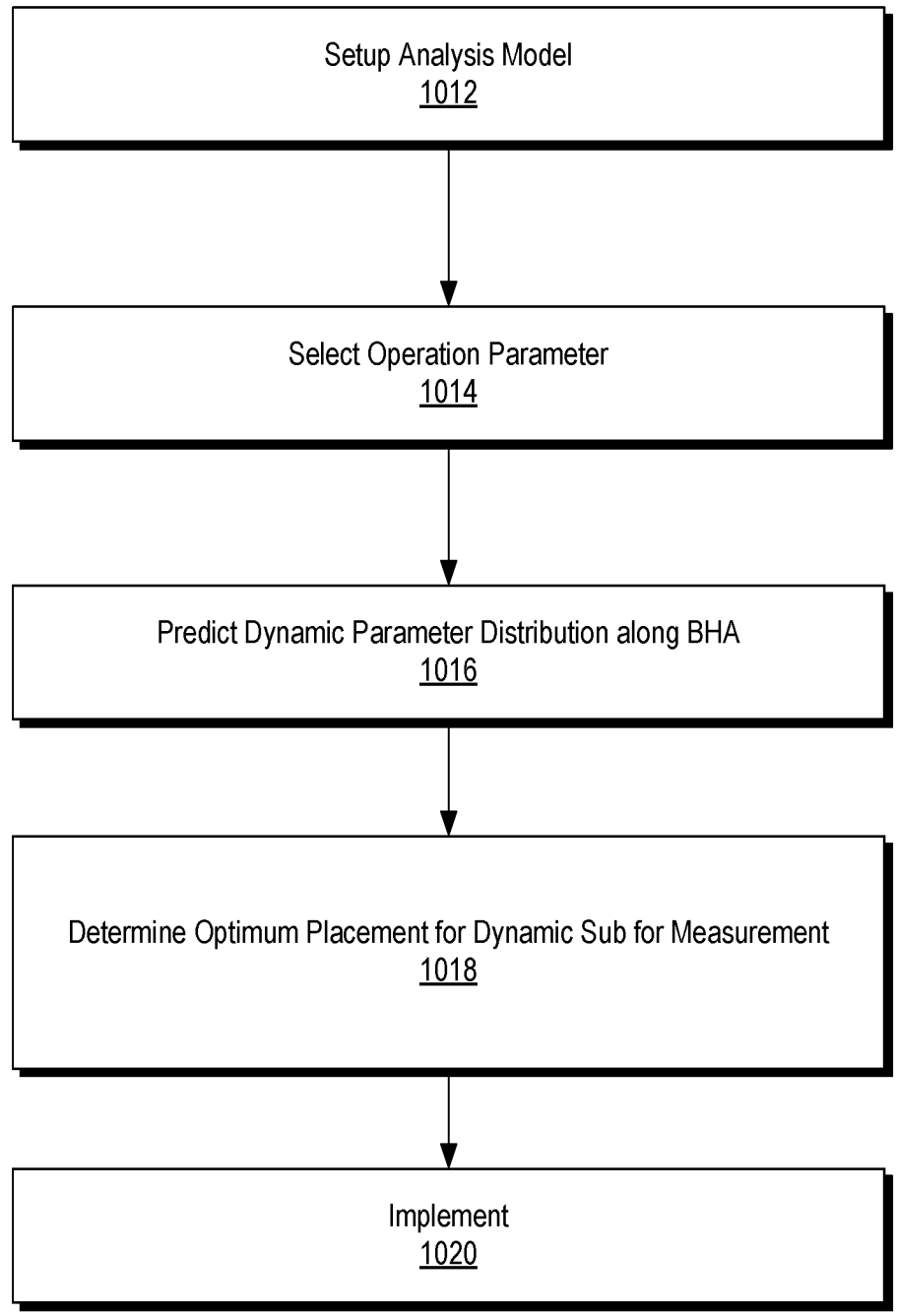
FIG. 10 illustrates an example of a method.

FIG. 10 shows an example of a method 1010 that includes a setup block 1012 for setting up an analysis model, a selection block 1014 for selecting one or more operational parameters, a prediction block 1016 for predicting one or more dynamic parameter distributions along at least a portion of a toolstring (e.g., a BHA, etc.), a determination block 1018 for determining an optimum placement or optimum placements for one or more dynamic subs that can acquire measurements, and an implementation block 1020 for implementing, at least in part, one or more of the optimum placements.

As an example, a method can be a workflow such as an optimum dynamic sub placement identification workflow. In such an example, a model can be setup; then one or more operation parameters can be selected, for example, based at least in part on field practice; next, the model can predicts a distribution of one or more dynamic parameters that the one or more dynamic subs measure; the workflow can include identifying an optimum placement or optimum placements for one or more types of dynamic subs, for example, based at least in part on a prediction or predictions such that a sub or subs can provide measurements of desired accuracy and/or sensitivity (e.g., consider signal to noise, type of vibrational modes expected, etc.). As an example, identification of optimum placement can consider a case where a sub measurement tends to be sensitive to measured signal magnitude, signal variation and/or influence of one or more other BHA components (e.g., and associated factors).

Figure 11:
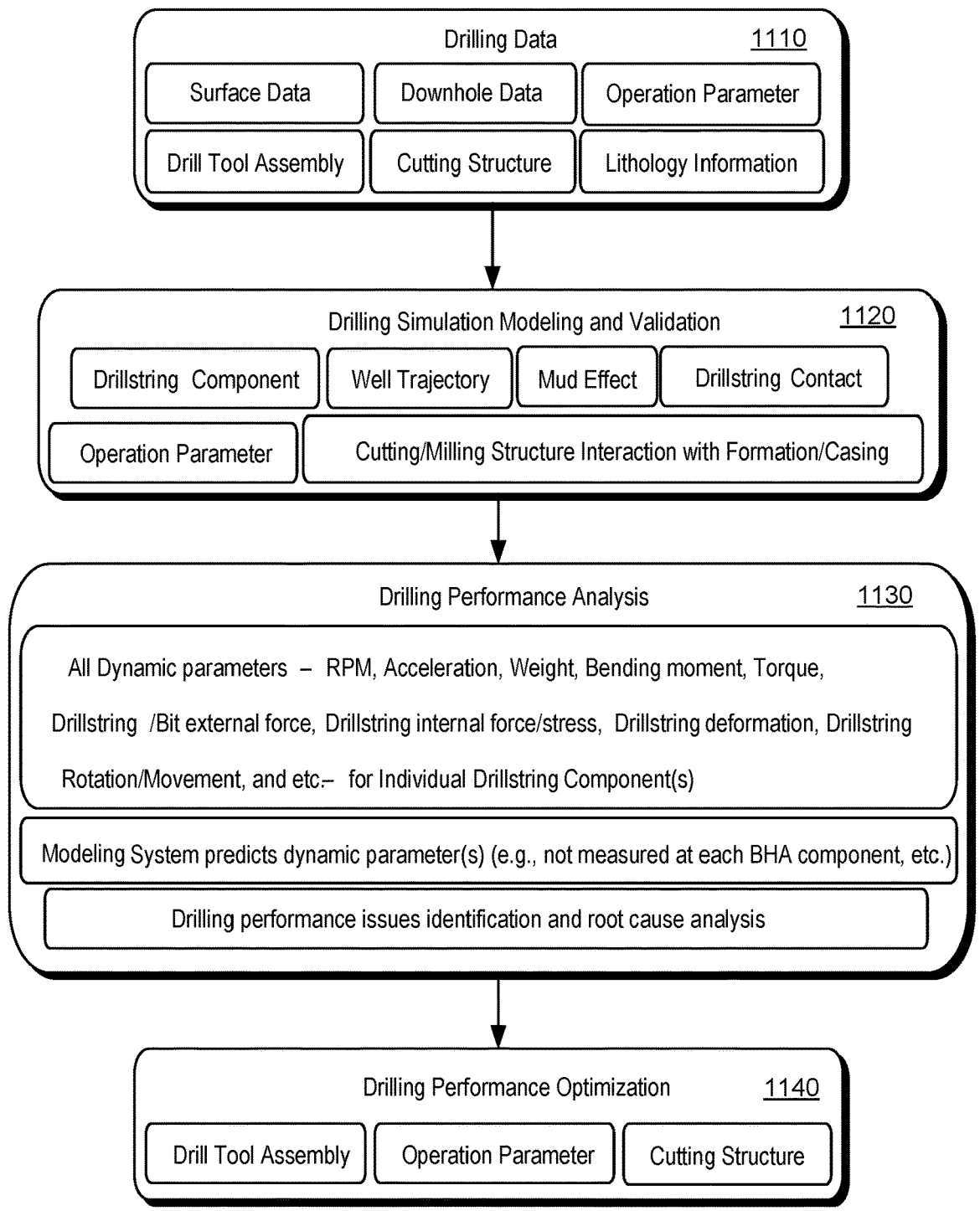
FIG. 11 illustrates an example of a system.

FIG. 11 shows an example of a system 1100 that includes a drilling data block 1110, a drilling simulation modelling and validation block 1120, a drilling performance analysis block 1130 and a drilling performance optimization block 1140.

As an example, the system 1100 may be utilized to implement one or more workflows. For example, consider a measurement and modeling analysis workflow.

As an example, after a field run with a dynamic sub, drilling data can be collected where, for example, the data includes drilling tool assembly, cutting structure, lithology information, operation parameter, surface data, downhole data (survey, LWD/MWD, dynamic sub), etc. Next, in such an example, a drilling simulation model can be setup and validated by the drilling data. As an example, considered factors can include, for example, one or more of drillstring component(s), well trajectory, mud effects, drillstring contact(s), operation parameter(s), cutting/milling structure interaction with formation/casing, etc. In such an example, a validated drilling simulation model can be used to analyze drilling performance. As an example, the model can generate dynamic parameters such as, for example, one or more of RPM, acceleration, weight, bending moment, torque, drillstring/bit external force, drillstring internal force/stress, drillstring deformation, drillstring rotation/movement, etc. As an example, a model can include portions that represent particular components of a drillstring. For example, a model can include a corresponding number of portions for a corresponding number of components that may be arranged at least in part in a serial order along the drillstring. As an example, a model can include a set of parameters that cover measured and not measured data, phenomena, etc. As an example, such a set of parameters can include dynamic parameters that can help identify one or more types of drilling performance issues and, for example, help to analyze one or more root causes. As an example, a validated drilling simulation model can be used to improve further drilling performance and to prevent/mitigate performance issues by optimize drill tool assembly, operation parameter, and/or cutting structure.

Figure 12:
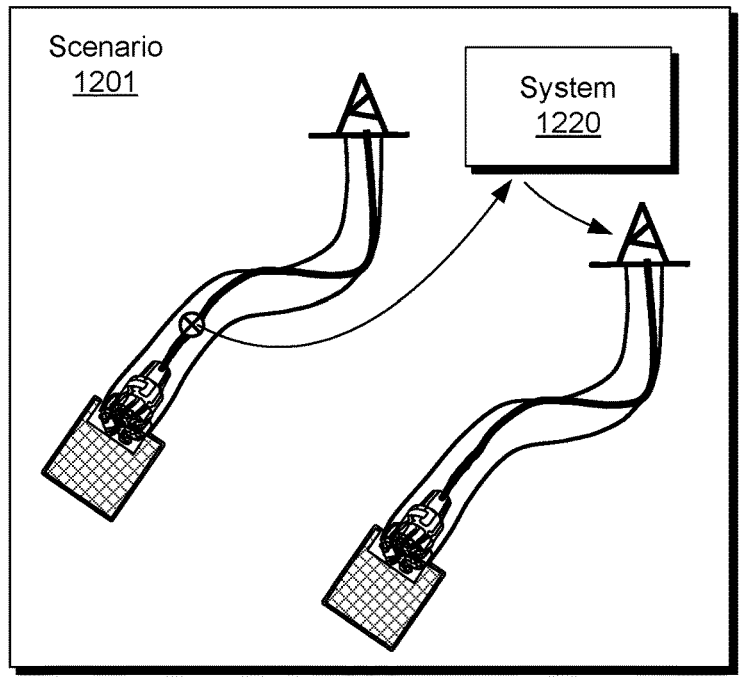
FIG. 12 illustrates an example of a scenario, an example of a system and an example of a method.
Figure 12:
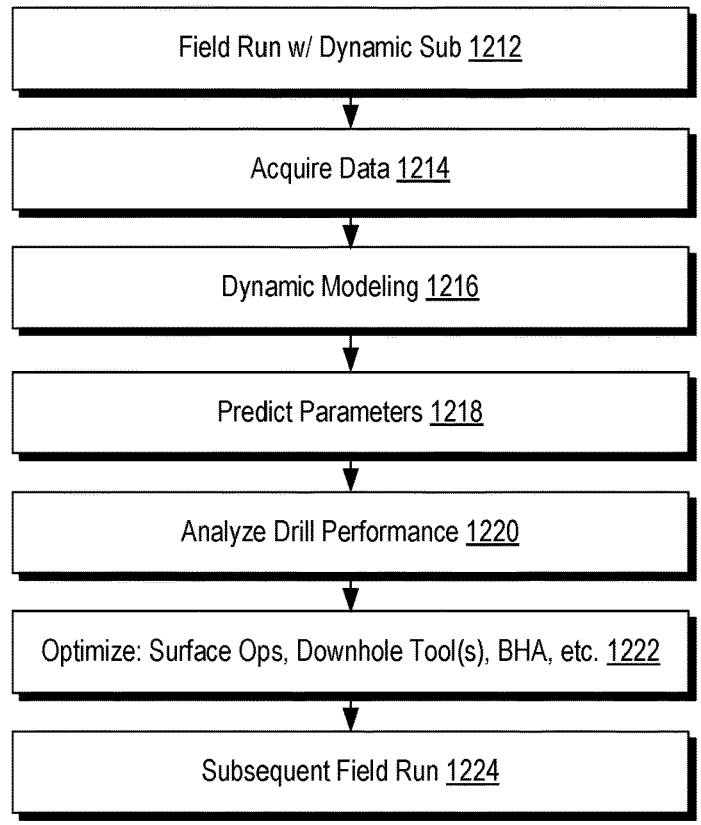
Figure 13:
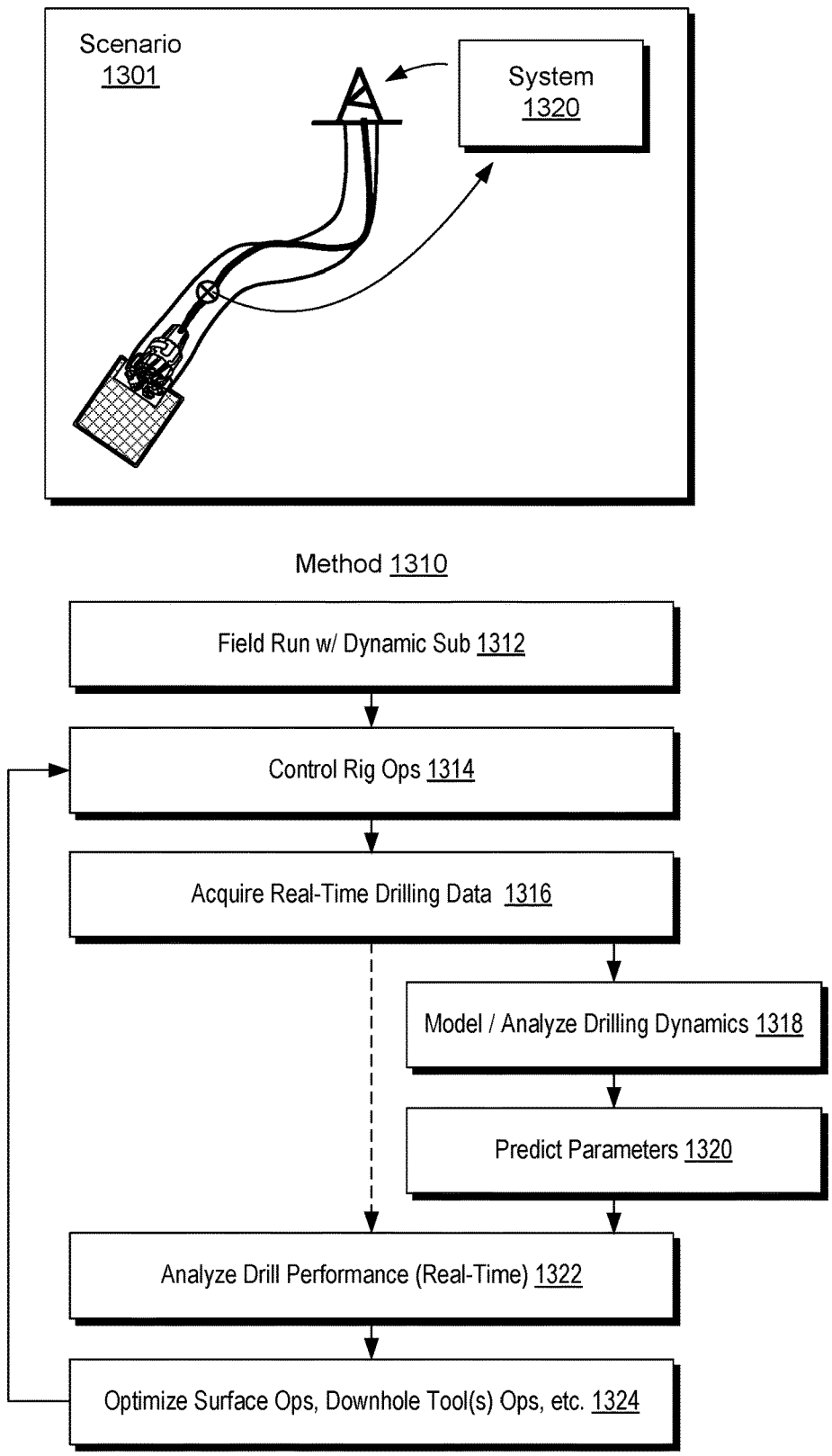
FIG. 13 illustrates an example of a scenario, an example of a system and an example of a method.
Figure 14:
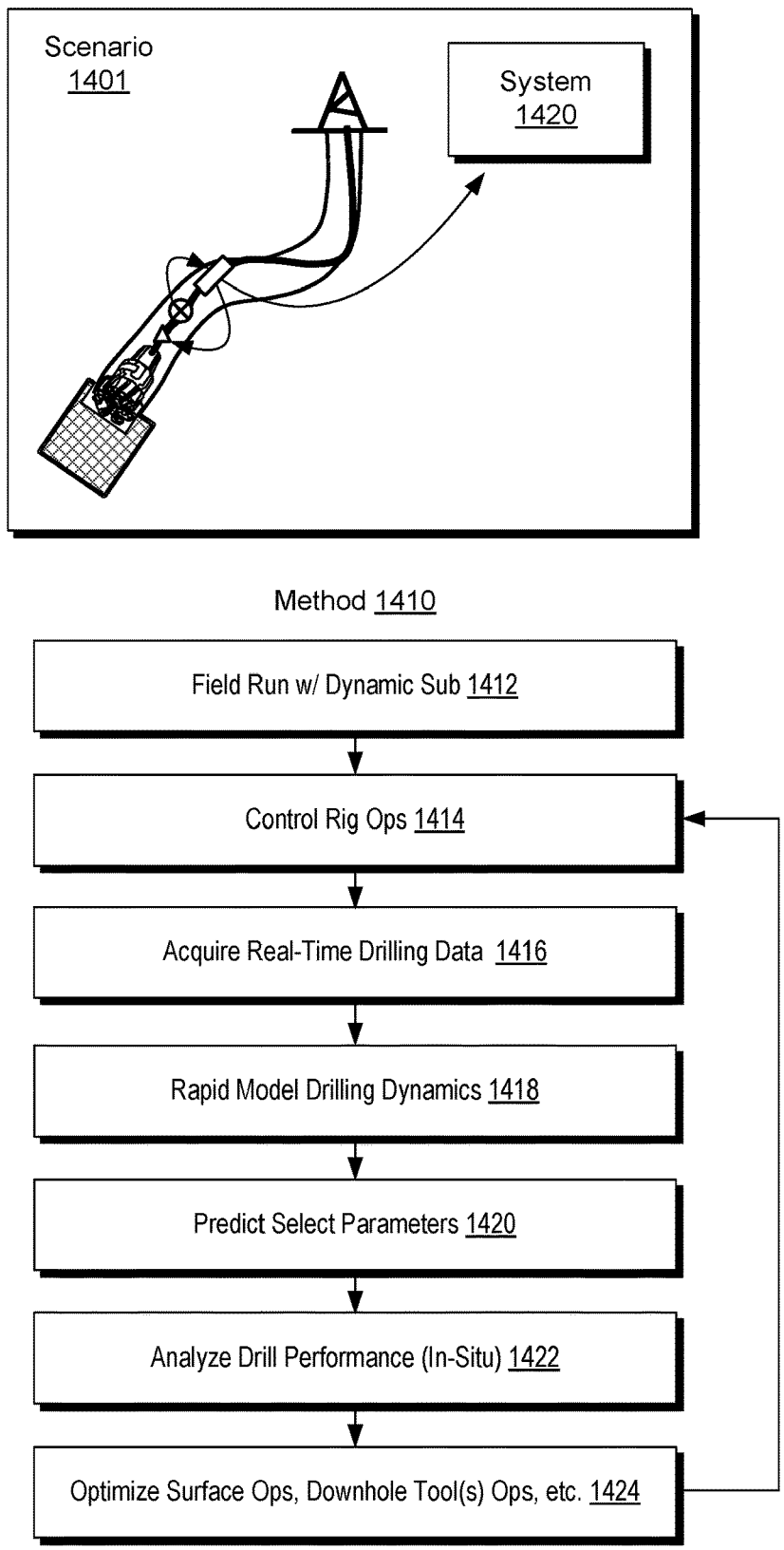
FIG. 14 illustrates an example of a scenario, an example of a system and an example of a method.

As mentioned, a system may provide for various modes of operation including, for example, post run analysis, open loop control and closed loop control. FIG. 12 shows an example, of a scenario 1201, an example of a method 1210 and an example of a system 1220 for post run analysis; FIG. 13 shows an example, of a scenario 1301, an example of a method 1310 and an example of a system 1320 for open loop control; and FIG. 14 shows an example, of a scenario 1401, an example of a method 1410 and an example of a system 1420 for closed loop control.

FIG. 12 shows an example, of a scenario 1201, an example of a method 1210 and an example of a system 1220 for post run analysis. As to the method 1210, it includes a run block 1212 for performing a field run with a dynamic sub or subs; an acquisition block 1214 for acquiring data; a model block 1216 for dynamic modeling based at least in part on acquired data, a prediction block 1218 for predicting at least one value for at least on parameter, an analysis block for analyzing drill performance based at least in part on a prediction, an optimization block 1222 for optimizing at least one piece of equipment and/or operation, and a run block 1224 for performing a subsequent field run (e.g., at another site, etc.), which may overlap at least in part in time with the run of the run block 1212.

As an example, after a field run with a dynamic sub, drilling data can be collected first and then the drilling dynamics are modeled. In such an example, dynamic parameters can be predicted. Next, drilling performance can be analyzed. Then, for one or more performance issues, a method can include generating an optimization plan of surface operation, downhole tool and/or BHA setup, for example, to be applied to improve drilling efficiency in future field run. Such an approach can be suitable for downhole recorded data analysis.

FIG. 13 shows an example, of a scenario 1301, an example of a method 1310 and an example of a system 1320 for open loop control. As to the method 1310, it includes a run block 1312 for performing a field run, a control block 1314 for controlling one or more rig operations, an acquisition block 1316 for acquiring real-time drilling data, a model and analysis block 1318 for modeling and analyzing drilling dynamics based at least in part on real-time drilling data, a prediction block 1320 for predicting one or more values for one or more parameters, an analysis block 1322 for analyzing real-time drill performance during the field run, and an optimization block 1324 for optimizing one or more aspects of the field run such as, for example, one or more of a surface operation, a downhole tool operation, etc. As shown, the method 1310 may continue to the control block 1314, which may control one or more downhole tools. As an example, the blocks 1318 and 1320 may be performed for a loop of the open loop approach of FIG. 13 or may be omitted from a loop. As an example, real-time drilling data may be assessed as to a limit or behavior which may trigger the method 1310 including the blocks 1318 and 1320 in a loop of an open loop approach.

As an example, a real-time open loop system can provide for downhole data to be transmitted to surface for real-time data analysis and operation optimization. In such an example, as a dynamic sub is running in the field, real-time drilling data (e.g., surface and downhole) are measured. In such an example, based at least in part on drilling data, drilling dynamics can be modelled and analyzed. As an example, values for a set of dynamic parameters at a plurality of individual drillstring components can be predicted via a model. In such an example, based at least in part on the values for the set of dynamic parameters, drilling performance can be analyzed in real-time. As to one or more performance issues, an optimization plan of surface operation and/or downhole tool operation can be generated and can be applied to rig operation control, for example, to improve drilling efficiency in real-time.

As mentioned, a workflow can include iterative loops, etc. where various actions may be triggered, for example, based at least in part on data, based at least in part on a schedule, based at least in part on a type of operation, based at least in part on a command trigger, etc. As an example, where a particular region is expected to raise one or more performance issues, a workflow may be triggered upon approach such a region, for example, based on depth of a drill bit, etc. Upon triggering, comparing to a "straight through" approach without blocks 1318 and 1329, a service can generate dynamic measurements that can provide for an in-depth, reliable and persuasive conclusion of performance analysis.

FIG. 14 shows an example, of a scenario 1401, an example of a method 1410 and an example of a system 1420 for closed loop control. As to the method 1410, it includes a run block 1412 for performing a field run, a control block 1414 for controlling one or more rig operations, an acquisition block 1416 for acquiring real-time drilling data, a model and analysis block 1418 for modeling and analyzing drilling dynamics based at least in part on real-time drilling data, a prediction block 1420 for predicting one or more values for one or more parameters, an analysis block 1422 for analyzing real-time drill performance during the field run (e.g., in-situ), and an optimization block 1424 for optimizing one or more aspects of the field run such as, for example, one or more of a surface operation, a downhole tool operation, etc. As shown, the method 1410 may continue to the control block 1414, which may control one or more downhole tools.

As an example, a workflow can implement a real-time close loop system where, for example, downhole data analysis and operation optimization is applied a real-time in closed loop manner. For example, as dynamic sub is running in the field, real-time drilling data (e.g., surface and downhole) can be acquired (e.g., measured, etc.). In such an example, based at least in part on the drilling data, a relatively rapid drilling dynamics modelling process can be applied where values for a selected set of dynamic parameters can be predicted (e.g., estimated via the modeling and based at least in part on real-time data). In such an example, in-situ drilling performance can be analyzed and an optimization plan of surface operation and/or downhole tool operation can be generated and applied, as appropriate.

As an example, when compared to an open loop system, a close loop system may focus on automation of modelling, analysis and optimization where the closed loop system can improve drilling performance effectively by tuning one or more drilling operational parameters, for example, directly through inter-tool communication. As an example, a system can include modes of operation such as a post run mode, an open loop mode and a closed loop mode. As an example, a mode may be selected and/or triggered during a field run.

Figure 15:
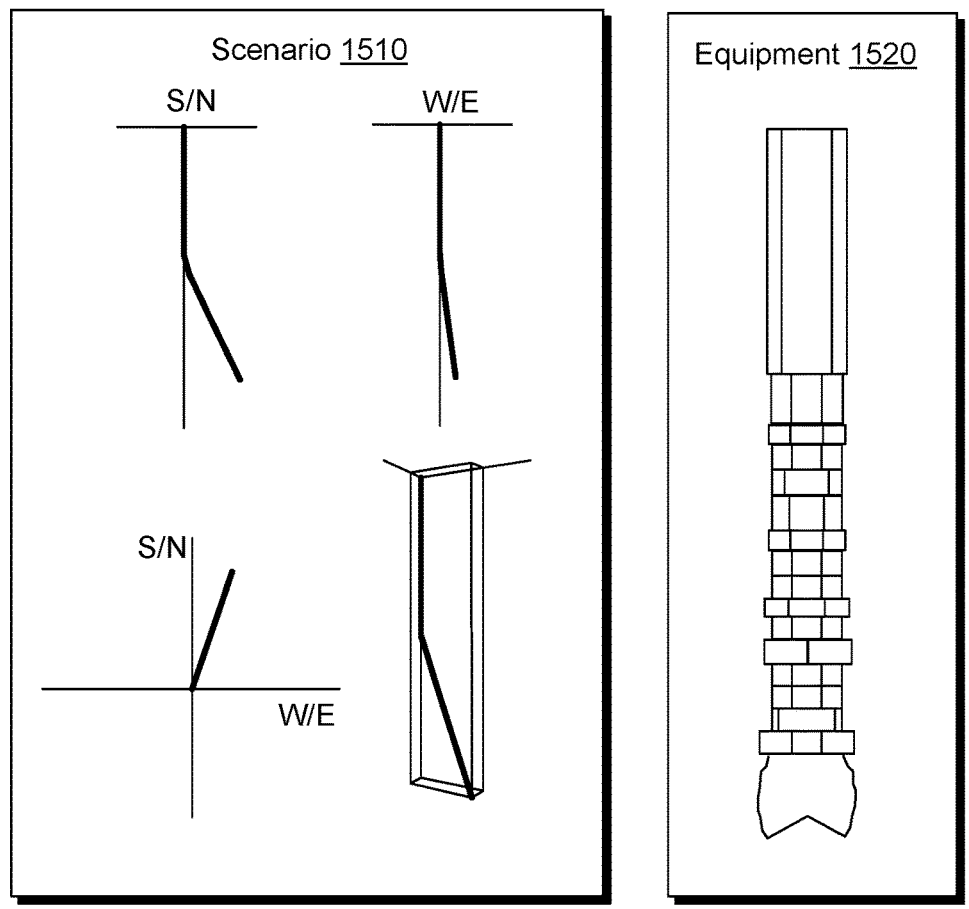
FIG. 15 illustrates an example of a scenario, an example of equipment and example plots.
Figure 15:
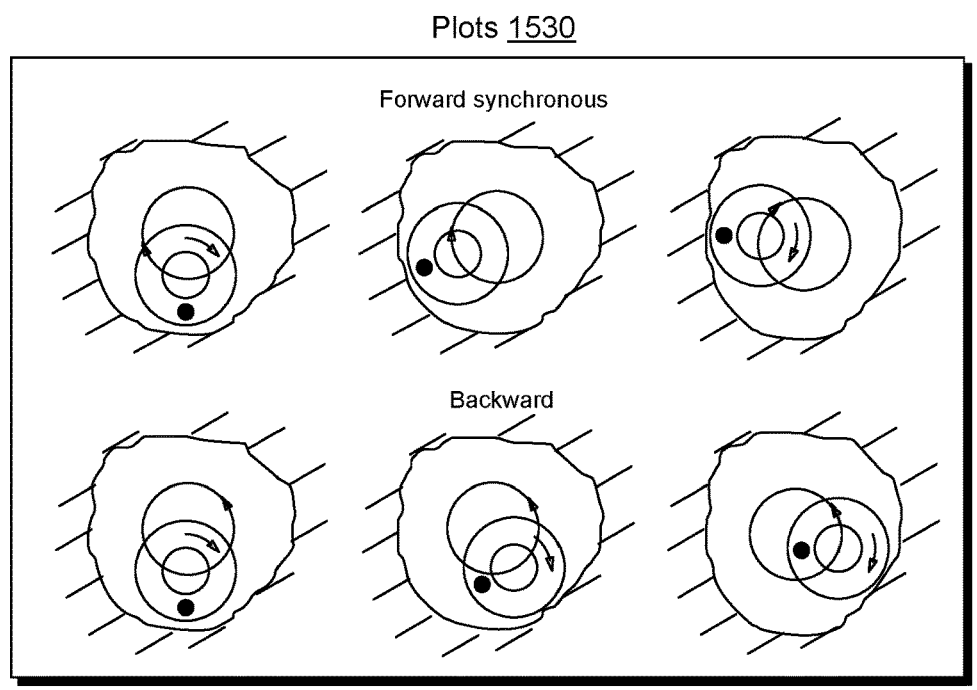

FIG. 15 shows an example of a scenario 1510 and an example of equipment 1520. As shown in FIG. 15, the equipment 1520 is composed of various components that are arranged in a particular order, which may depend on sizes of pieces of equipment, etc. For example, a configuration of components in a string may depend on sizes such as diameter and/or axial length.

FIG. 15 also shows plots 1530 pertaining to phenomena such as, for example, whirl. Lateral vibrations tend to be a more destructive type of vibration and can create large shocks as a BHA impacts a well bore wall (e.g., contact). Interaction between BHA and drillstring contact points may, in certain circumstances, drive a system into backward whirl. Backward whirl tends to be a more severe form of vibration, creating high-frequency large-magnitude bending moment fluctuations that can result in high rates of component and connection fatigue. As an example, imbalance in an assembly of components can cause centrifugally induced bowing of a drillstring, which may produce forward whirl and, for example, result in one-sided wear of components.

As an example, vibrations can be characterized by type such as, for example, axial, torsional and lateral, which may occur during rotary drilling and which may be coupled. As an example, induced axial vibrations at the bit can lead to lateral vibrations in a BHA and axial and torsional vibrations may be observed at the rig floor and may be related to severe lateral vibrations downhole (e.g., near the bit). As an example, at times, severe axial vibrations near the bit may show no readily discernable visible vibrations at the surface. As an example, axial and lateral vibrations can be more violent in vertical or low-angle wells, and the displacements and bending moments introduced by lateral vibrations may increase as the ratio of hole size to BHA collar size increases.

As to types of vibration models, consider a frequency domain type and a time domain type. As an example, consider a frequency domain model (e.g., the Schlumberger BHAV model) that may tend to be executable in a relatively rapid manner. As an example, a static model can be used to compute BHA touch points and this information can be used to compute the natural frequencies of the drillstring and BHA.

As an example, a method can include selecting one or more excitation sources (e.g., imbalance, bit blades, etc.) and can include computing a specific estimated RPMs associated with a source or sources. In such an example, an RPM can be a surface rotational speed at which the frequency of the excitation source is expected to coincide with natural frequencies of a BHA. As an example, interaction between a drillstring and a borehole wall may or may not taken into consideration.

As an example, a sensor or sensors may be included in a drillstring where such a sensor or sensors can measure one or more physical phenomena associated with vibration (e.g., optionally including whirl). As an example, a sensor or sensors may be sensitive to impact force, for example, when a portion of a drillstring contacts a bore wall. As an example, a sensor or sensors may be sensitive to wear, for example, consider frictional wear due to contact of a component and a bore wall. As an example, a sensor or sensors may be included in a drillstring that can measure impact force. As an example, a sensor or sensors may be included in a drillstring that can measure wear (e.g., directly and/or indirectly).

As an example, a sensor may be positioned at a distance from another component to reduce noise, improve sensitivity, reduce wear, etc. In such an example, a desired distance may be achieved via an approach that implements an optimization algorithm such as a linear algorithm, a non-linear algorithm, etc.

As an example, consider a linear programming approach that aims to achieve a best order of components along a string (e.g., maximum performance of one or more sensors, lowest cost, etc.). Such an approach can include formulating a mathematical model where constraints are represented by linear relationships. As an example, consider implementing a technique for the optimization of a linear objective function, subject to linear equality and linear inequality constraints. In such an example, a feasible region can be a convex polytope, which is a set defined as the intersection of finitely many half spaces, each of which is defined by a linear inequality. In such an example, an objective function can be a real-valued affine (linear) function defined on this polyhedron. As an example, a linear programming algorithm can be implemented via a computing device, system, etc., to find a point in the polyhedron where the objective function has a smallest (or a largest) value (e.g., where such a point exists).

As an example, a solution as to an optimization problem may be an order of components that can be operatively coupled to form at least a portion of a toolstring. As an example, a constraint may specify a separation distance between two components. As an example, a constraint may be linked to noise, for example, as a relationship between distance between one component and one or more components. As an example, noise may be a sum of distances between a component and one or more other components, which, for example, may contribute a particular amount of noise. As an example, a constraint may pertain to sensitivity as to a location. For example, consider a constraint that applies a weight as to an objective function where "cost" increases the further a component is away from a most desirable location along a string of components.

In FIG. 15, the scenario 1510 and the equipment 1520 may be analyzed to determine, for example, a location's effect on dynamic sub measurement, which can demonstrate capability of dynamic modeling to find an optimum sub placement.

In the example of FIG. 15, consider the equipment 1520 as including an 8½ inch XCeed RSS BHA where the scenario 1510 is an offshore drilling scenario that includes a well plan as illustrated in various plots of the scenario 1510.

As an example, an application such as a DMM (e.g., consider OPTIDRILL™ technology) can be used to measure bending moment and acceleration of the equipment 1520.

Figure 16:
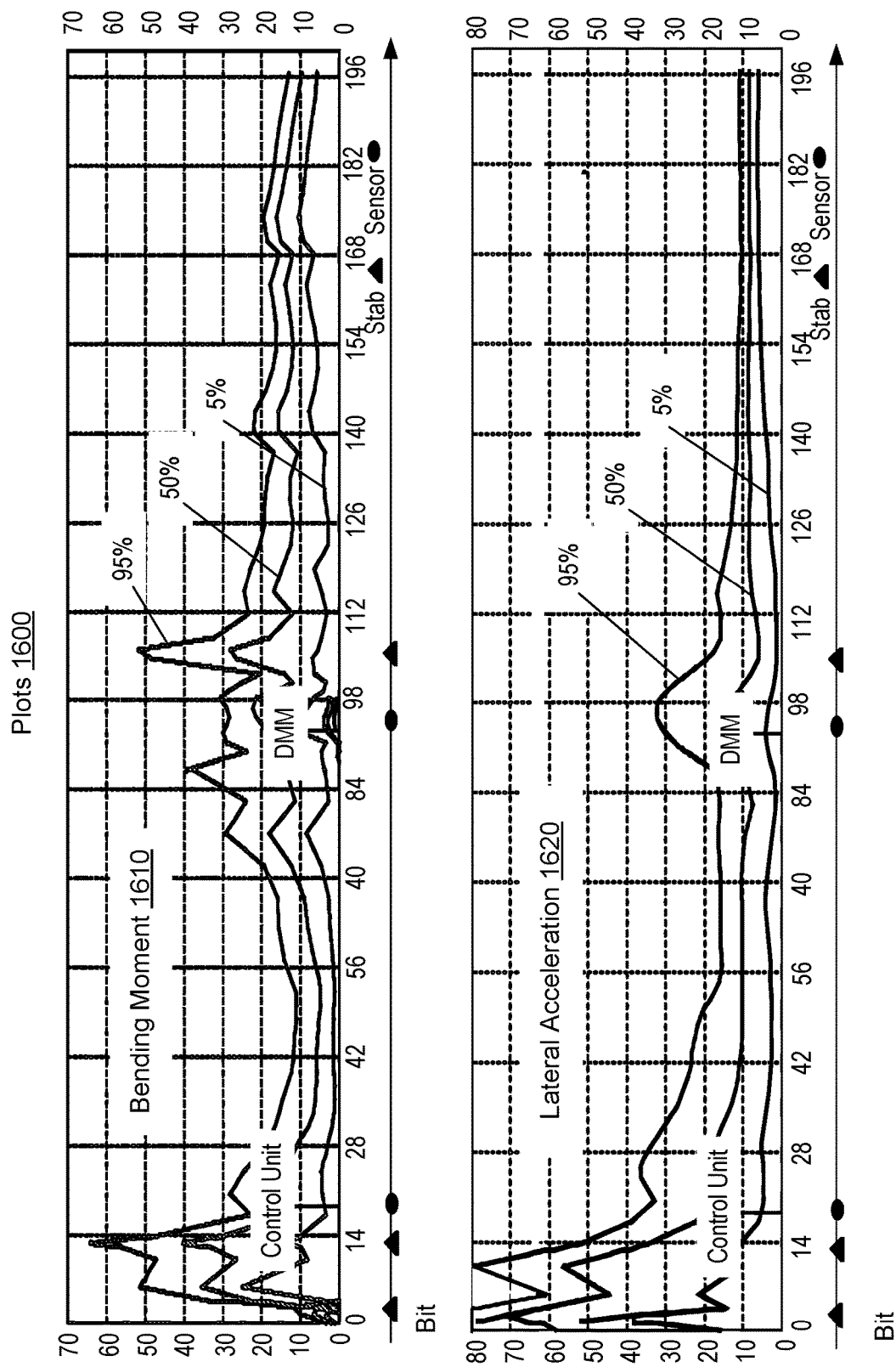
FIG. 16 illustrates example plots.

FIG. 16 shows plots 1600 that include a plot 1610 of bending moment distribution and a plot 1620 of lateral acceleration. In the plots 1600, the distance is shown as being measured from a bit along a BHA such as the equipment 1520 of FIG. 15. More specifically, the plots 1600 show the dynamic modeling predicted distribution of bending moment (the plot 1610) and lateral acceleration (the plot 1620) along the BHA. As shown, the bending moment and acceleration tend to have relatively large variation along the BHA.

As an example, the variation of measured bending moment can be used to detect the BHA whirling. For example, for a possible backward whirling scenario, IDEAS modeling can predict variation of the bending moment (Ty, Tz) at one or more different locations.

Figure 17:
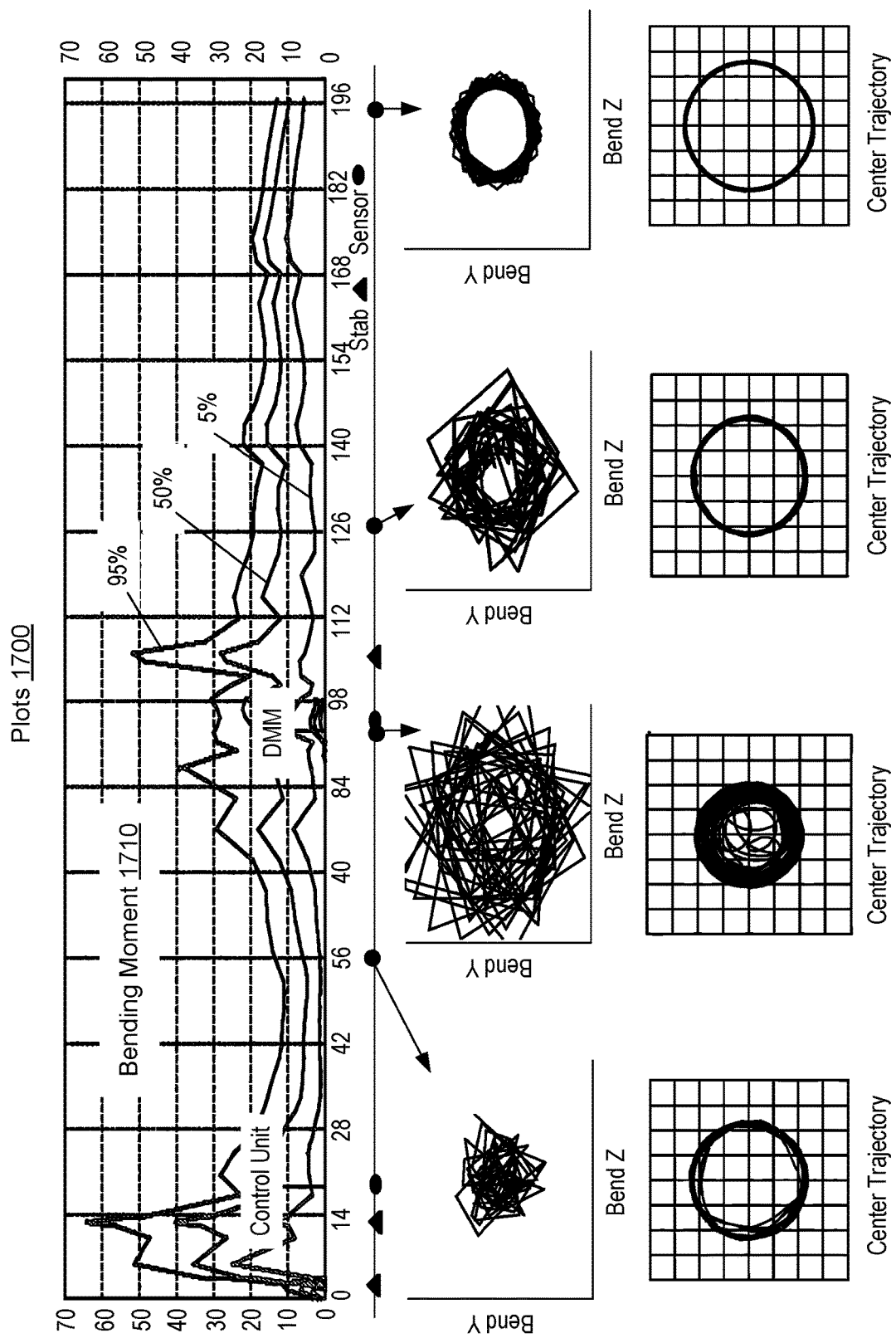
FIG. 17 illustrates example plots.

FIG. 17 shows plots 1700 that include a bending moment plot 1710 and additional plots at four different locations along the BHA. The plots of bending moment include information for both clockwise and counter-clockwise bending moment variation where, in these examples, counter-clockwise bending moment tends to predominate.

As shown in FIG. 17, at the four locations, there is relatively similar collar center trajectory and backward whirling condition. The variation of bending moment, however, shows different magnitude and rotation direction sensitivity at these different locations.

The plots 1600 of FIG. 16 and the plots 1700 of FIG. 17 show how location can have an effect or effects on accuracy of measurement(s) and, for example, help to demonstrate how one or more location(s) can be determined. As an example, one or more of the locations may be deemed optimal. As an example, locations may be ranked. As an example, locations may be cast as one or more constraints as part of an optimization process (e.g., linear programming, etc.) to determine at least a portion of an order of components of a string.

Specifically, FIG. 17 shows modeling prediction on bending moment (Tyz) distribution along the BHA from bit, bending moment (Ty, Tz) variation at different locations along the BHA (as indicated), and collar center trajectory at different locations.

Figure 18:
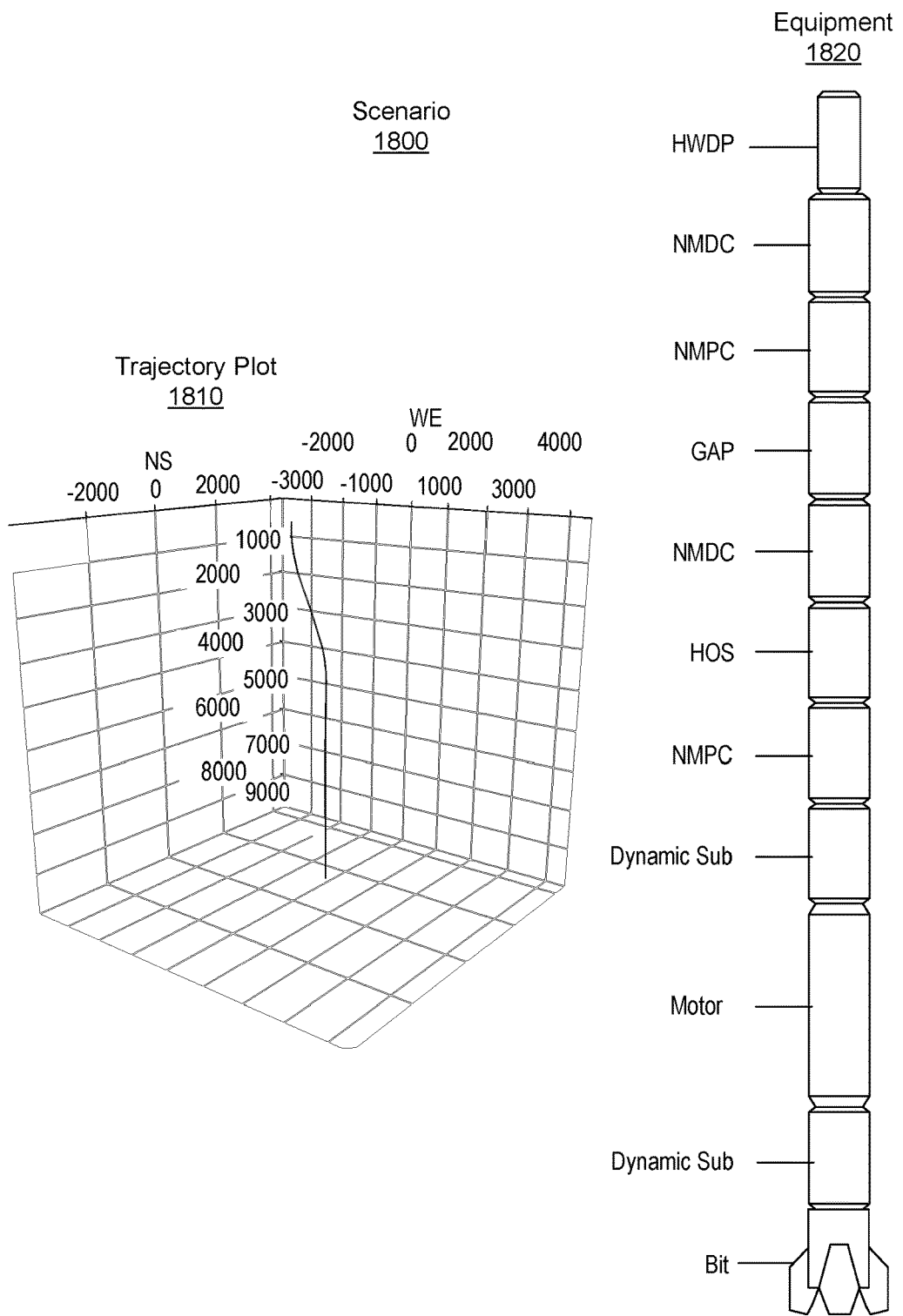
FIG. 18 illustrates an example of a trajectory plot and an example of equipment.

FIG. 18 shows an example of a scenario 1800 that includes an example of a trajectory plot 1810 as to a planned bore to be drilled in a formation (e.g., a geologic environment) and an example of equipment 1820 as a toolstring that includes a plurality of components. As shown in the example equipment 1820 of FIG. 18, eleven components are included with associated functionalities (e.g., structure, couplings, circuitry, etc.) and associated dimensions (e.g., length, diameters, etc.).

As an example, a system can be utilized given inputs such as plan information and equipment information. As an example, consider a system that is implemented as to a workflow that is to assess the trajectory plot 1810 as pertaining to a direction drilling in a geologic environment in the state of Utah where the equipment 1820 includes a motor such that the equipment 1820 may be considered to be or include a motor driven BHA.

As shown in the example equipment 1820 of FIG. 18, to measure downhole dynamics two dynamic subs (see, e.g., the dynamic sub 802 of FIG. 8, etc.) are implemented. As shown, one of the dynamic subs is positioned in an order location one above the bit, which may be a numeric order of 2 where the bit is number 1, and the other one of the dynamic subs is positioned in an order location at the top of the motor (e.g., PDM), which has a numeric order of 4 where the bit is number 1.

In the example equipment 1820, the dynamic subs may be utilized to log data at about 1024 Hz where, for example, surface data may be collected at about 1 Hz.

As an example, the dynamic sub measurements can provide downhole RPM and acceleration at measured locations: at top of bit and at top of motor.

Figure 19:
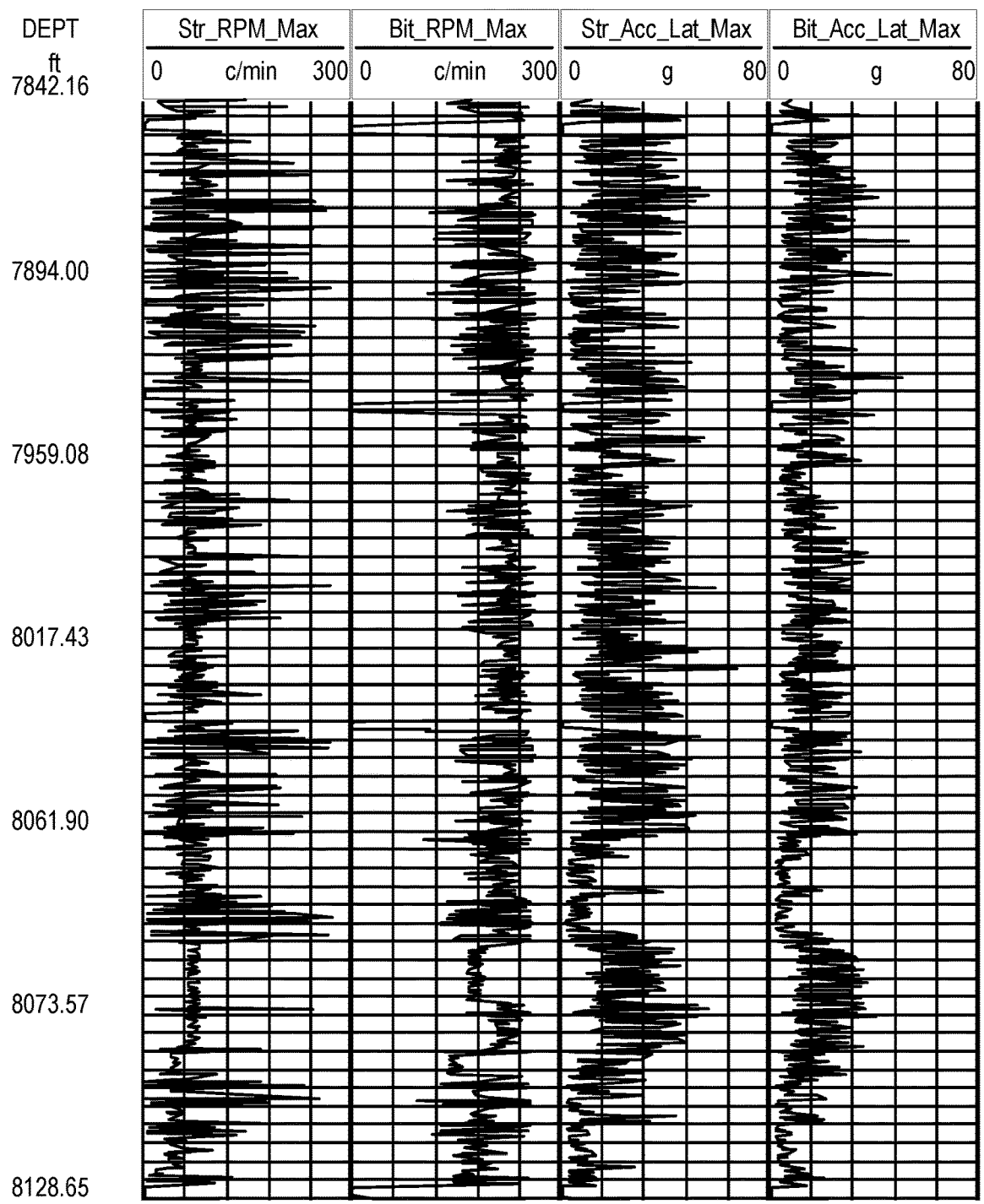
FIG. 19 illustrates example plots.

FIG. 19 shows example plots 1900 that include downhole data from the dynamic subs of the equipment 1820, for example, as various aspects of the scenario 1800 are operationally performed in the field (e.g., according to a portion of the trajectory plot 1810, etc.). For example, the depths in the plots 1900 range from about 7840 feet to about 8130 feet, which may correspond to depths of a portion of the trajectory plot 1810. As shown in the plots 1900, a performance issue can be identified by data that shows relatively large RPM variations and high lateral accelerations. From viewing the data of the plots 1900, a root cause or root causes of these identified issues cannot be readily ascertained.

As an example, information associated with the scenario 1800 of FIG. 18 (e.g., data of the plots 1900 of FIG. 19, etc.) may be augmented and/or extended, for example, as part of an additional scenario and/or continuing scenario. For example, an IDEAS, 3D time-based drilling modeling system can be used to model a drilling process as part of a scenario or scenarios.

Figure 20:
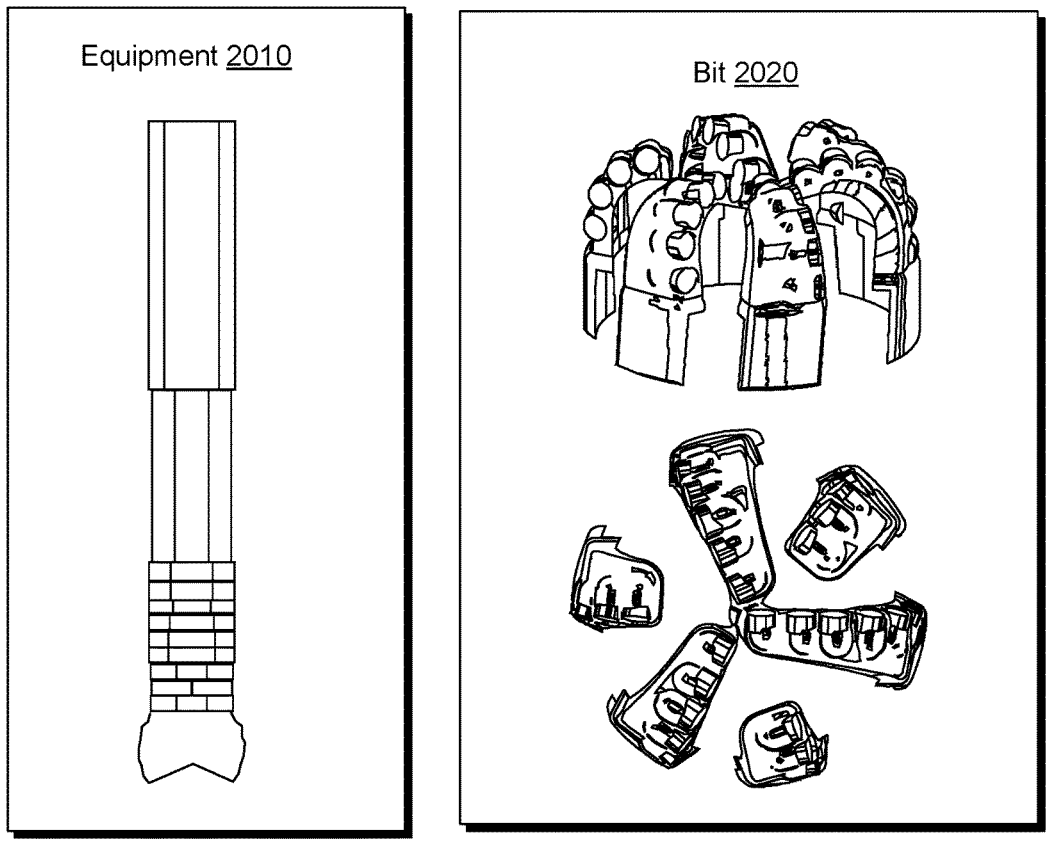
FIG. 20 illustrates an example of a scenario.
Figure 20:
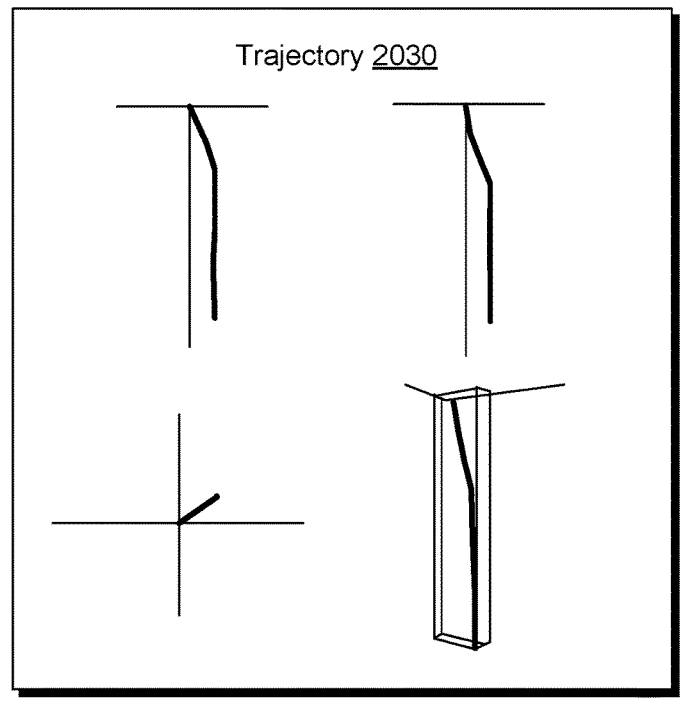

FIG. 20 shows an example of a scenario 2000 that includes an example of equipment 2010, an example of a bit 2020 of the equipment 2010 and an example of a trajectory 2030. As an example, the scenario 2000 may be representative of a part or parts of the scenario 1800 of FIG. 18 and/or an extension of the scenario 1800 of FIG. 18. The scenario 2000 can provide various types of setup information for an IDEAS model, for example, that includes the equipment 2010 as a BHA, the bit 2020 as including particular bit structure and the trajectory 2030 as being a desired well trajectory.

As an example, the model may be validated at least in part by measured data. After validation, the model may be utilized to generate values for one or more additional dynamic parameters along the drillstring (e.g., the equipment 2010), for example, so as to help analyze drilling performance issues.

Figure 21:
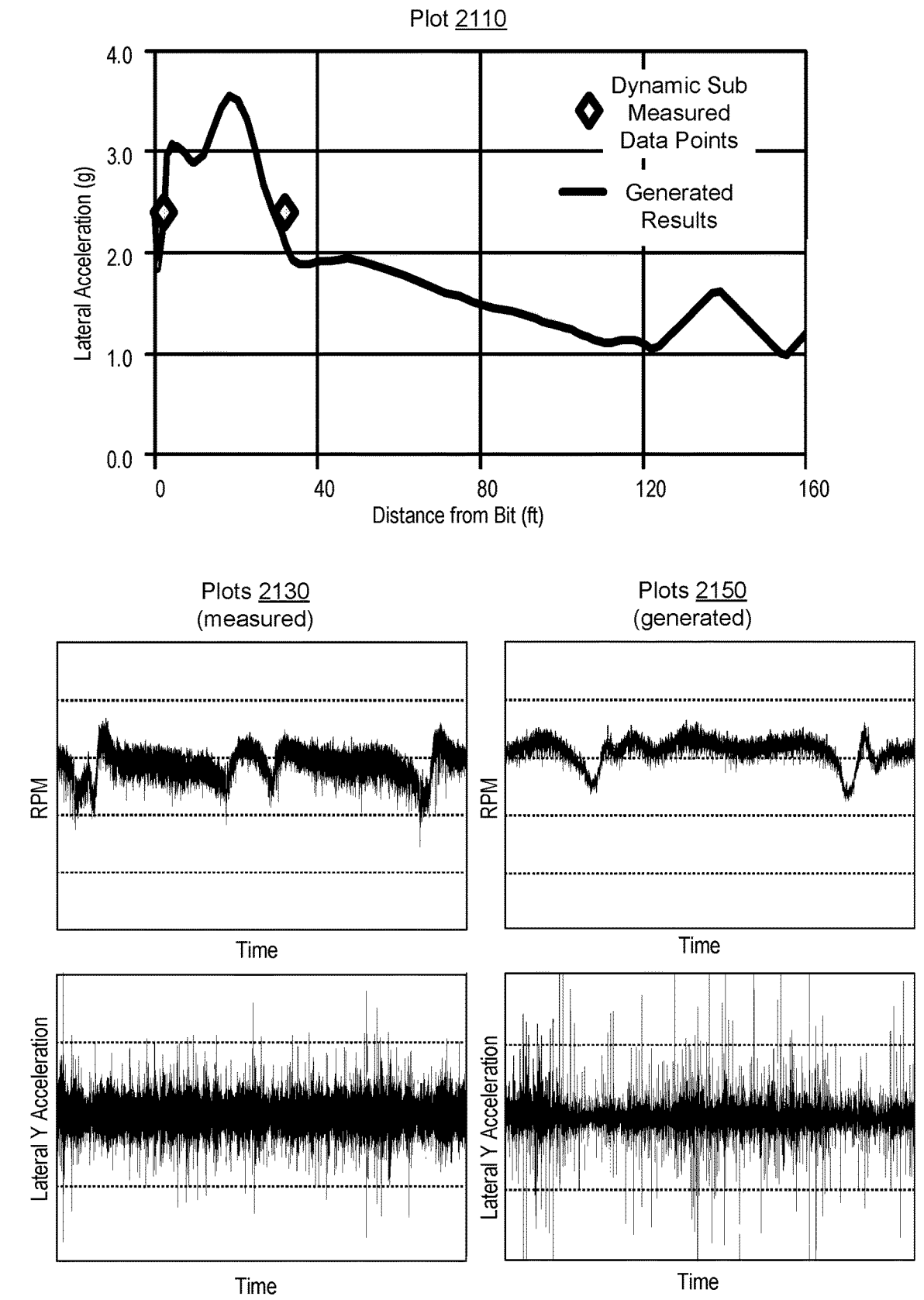
FIG. 21 illustrates example plots.
Figure 22:
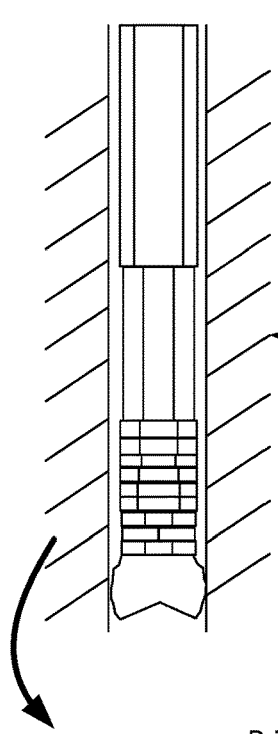
FIG. 22 illustrates an example of equipment and example plots.
Figure 22:
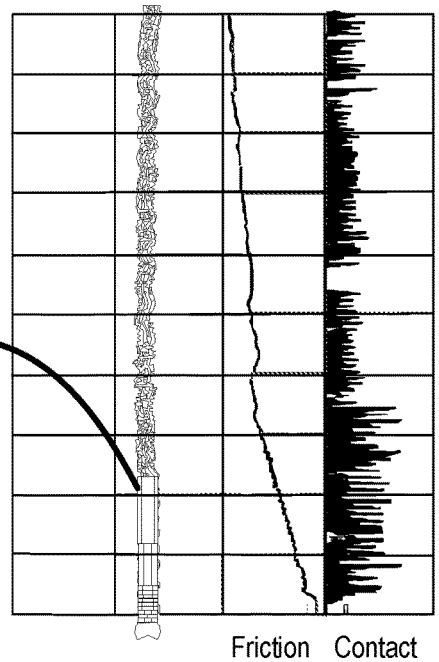
Figure 22:
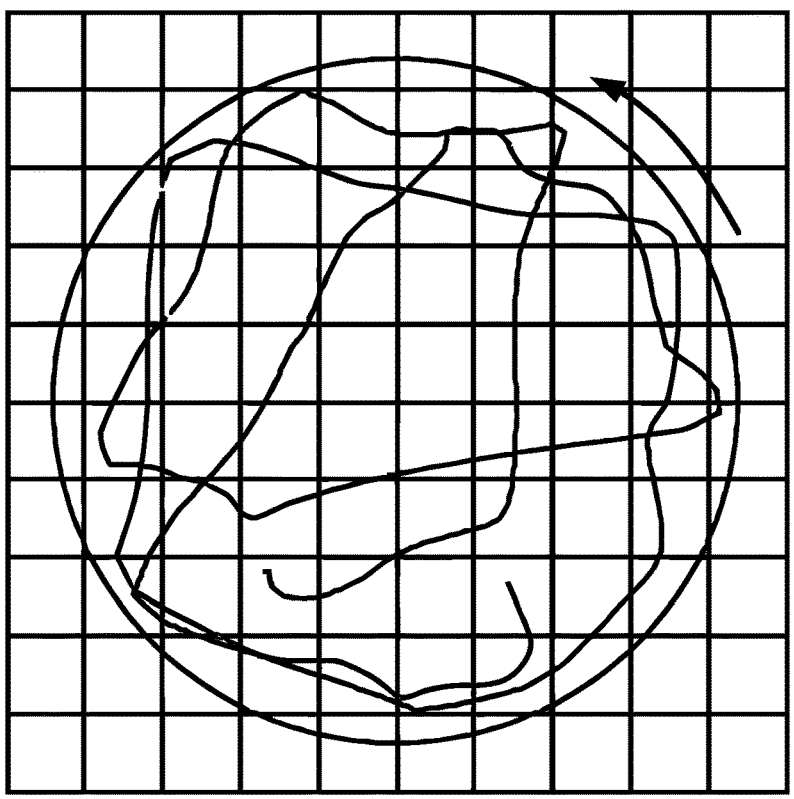

FIG. 21 shows example plots 2110, 2130 and 2150 and FIG. 22 shows an example of equipment 2210, an example plot 2222 and an example plot 2224.

In FIG. 21, the plot 2110 shows a distribution of lateral acceleration along a BHA where diamonds indicate results from dynamic sub measurements and where the curve is a result from the IDEAS model. As an example, a system may generate a curve such as the curve in the plot 2110 based at least in part on a model and based at least in part on dynamic sub information (e.g., real-time measurements, etc.). As an example, a system can generate a profile along at least a portion of a drillstring based at least in part on measurements at a number of points to along the drillstring. For example, as illustrated in the plot 2110 of FIG. 21, two dynamic subs of a drillstring can provide information that can be received by a system where a model of the system can process such information and output information for a length of the drillstring that extends at least in part between one of the dynamic subs and a drill bit, at least in part between the two dynamic subs and/or at least in part between one of the dynamic subs and an uphole portion of the drillstring.

In FIG. 21, the plots 2130 correspond to measured values for RPM and lateral Y acceleration with respect to time and the plots 2150 correspond to generated values for RPM and lateral Y acceleration with respect to time. The plots 2130 and 2150 demonstrate validation of simulation (e.g., generated values) for a model-based approach that simulates a drilling operation. Rig surface data can also be generated and, for example, validated (e.g., at a desired time or times).

As an example, a method can include setting up a model (e.g., IDEAS model, etc.), simulating a drilling operation, and controlling one or more control parameters of the drilling operation based at least in part on the simulating. In such an example, the simulating can be based at least in part on measurements acquired via one or more downhole sensors and, for example, one or more measurements acquired via one or more surface sensors (e.g., surface rig-based sensors, etc.). As an example, a method can include validating generated results. For example, a simulation can be validated via rig surface data and downhole data. As shown in the plots 2130 and 2150, generated results (e.g., predictions) represent various aspects of measured values for RPM and acceleration.

For a particular simulation corresponding to the scenario 2000 of FIG. 20, with input parameter values for SRPM of about 60, weight on bit (WOB) of about 22 klbs, and a flow rate of about 600 GPM, rig surface data and generated results were compared. As to ROP, rig surface data indicated 105 feet per hour while generated results indicated 115 feet per hour. As to STOR, rig surface data indicated 11 klbs-ft while generated results indicated 10 klbs-ft.

FIG. 22 shows in the plots 2222 and 2224 high contact force distributed along a drillstring, large drillstring deformation and backward collar center movement trajectory. These results indicate the BHA backward whirling is a root cause, which induces large RPM variation and high lateral vibration. As an example, a system can provide for computation of values for dynamic parameters based at least in part on dynamic sub measurements and determining a root cause of one or more identified behaviors via an analysis based at least in part on the values for the dynamic parameters.

Figure 23:
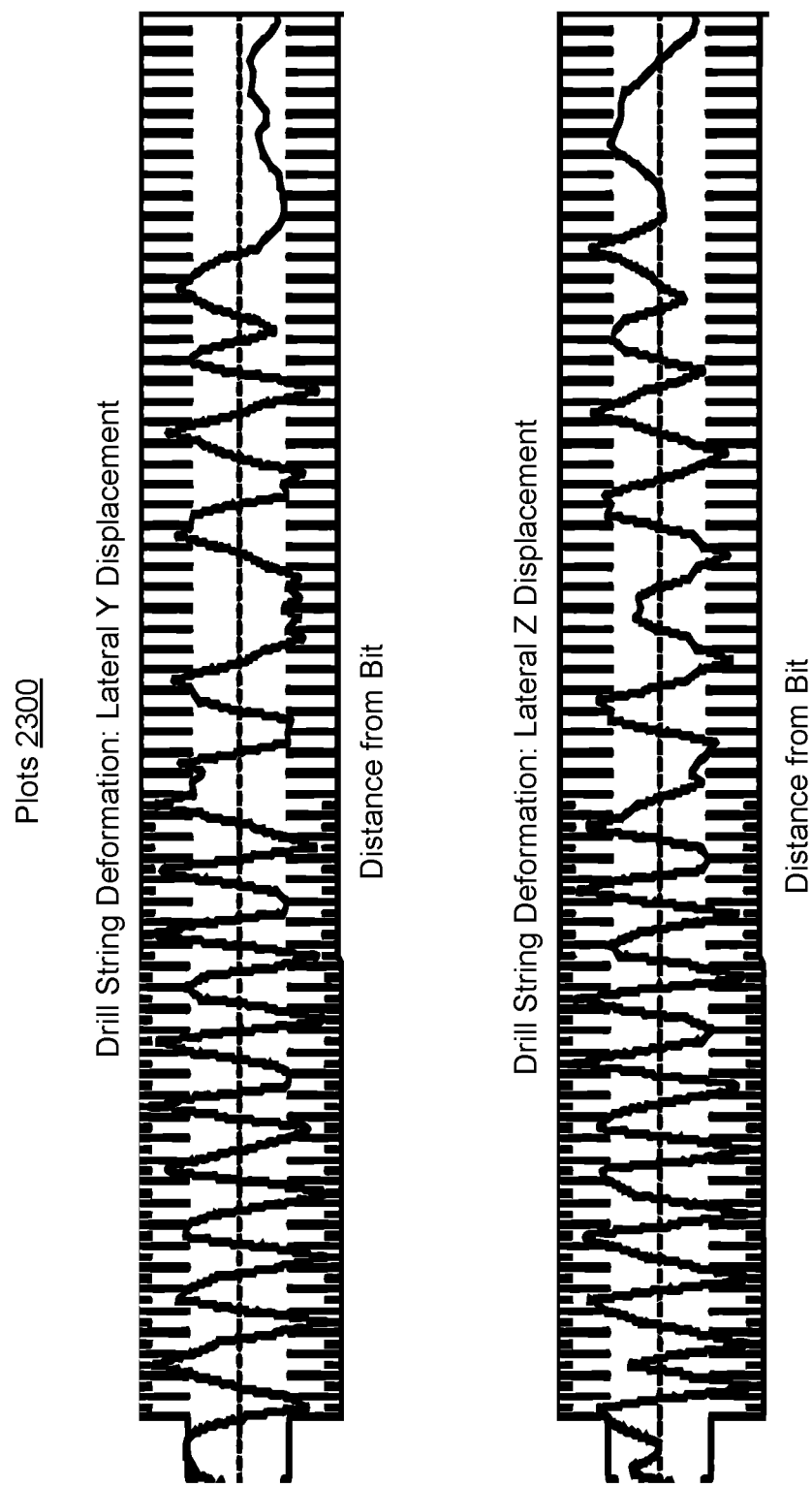
FIG. 23 illustrates example plots.

FIG. 23 shows example plots 2300 of drillstring deformation versus distance from bit. As shown in the plots 2300, the lateral displacements in Y and Z directions tend to decrease as distance from the bit increases.

As an example, the scenario 2000 of FIG. 20 can be extended. For example, modeling can include generating values for one or more types of parameters, which may include parameter values that are not measured due to lack of a sensor or sensors, parameter values that are not measured where a corresponding sensor or sensors are available to make measurements, parameter values that may be measured and not transmitted to a processing unit or units (e.g., for analysis, etc.), etc. As an example, a workflow can include generating values for one or more parameters such as, for example, one or more of force parameters, stress parameters, movement parameters, etc. As an example, such a workflow can also include acquiring and/or assessing values for one or more parameters such as, for example, vibration parameters, RPM parameters, etc. As an example, a workflow can include generating values for one or more parameters that are not directly measured and, for example, acquiring and analyzing values for one or more parameters that are directly measured.

Figure 24:
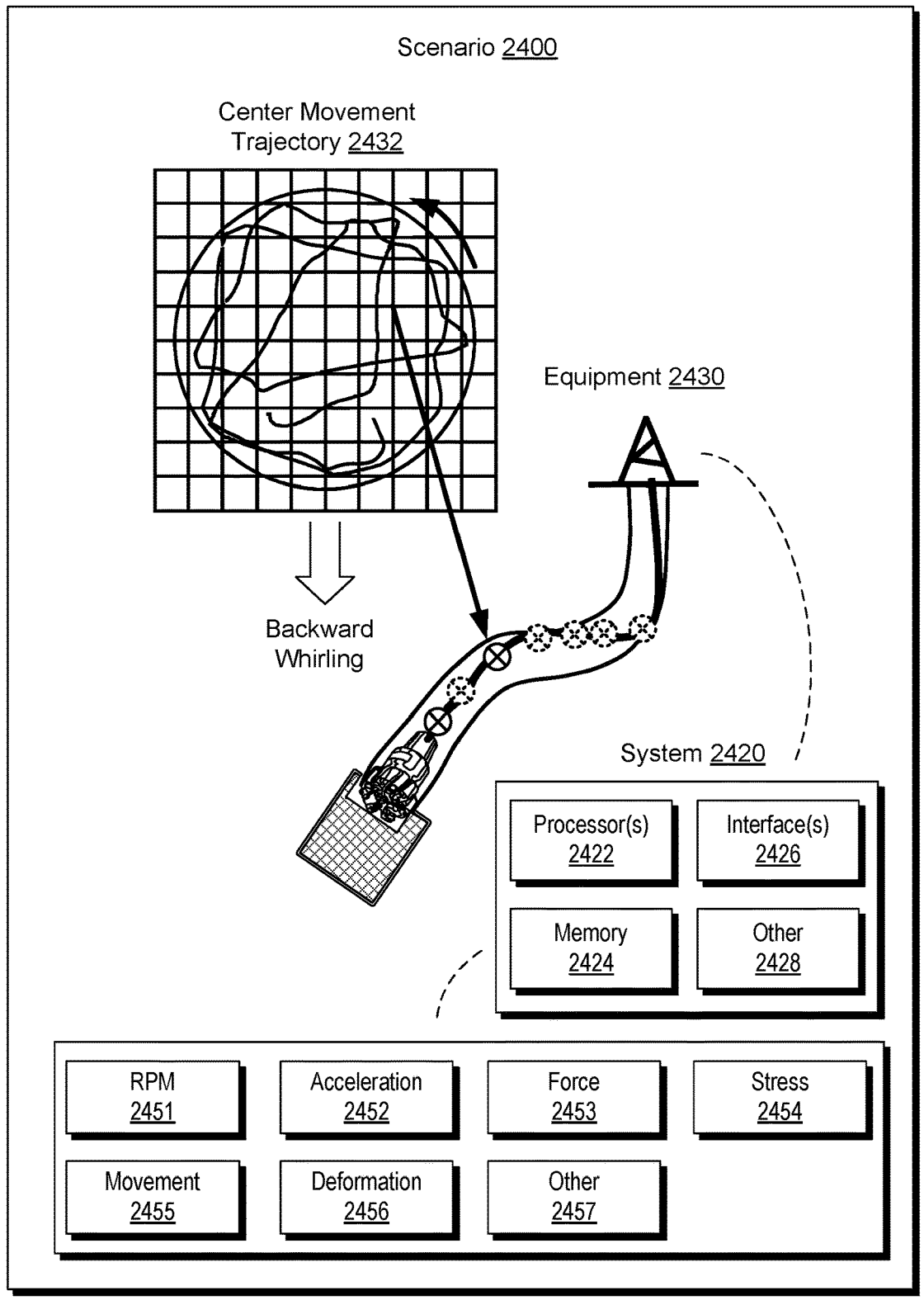
FIG. 24 illustrates an example scenario and an example of a system.

FIG. 24 shows an example of a scenario 2400 that includes an example of a system 2420 that includes one or more processors 2422, memory 2424 operatively coupled to at least one of the one or more processors, one or more interfaces 2426 and, for example, one or more other components 2428. As an example, the scenario 2400 may be representative of a part or parts of the scenario 2000 of FIG. 20 and/or an extension of the scenario 2000 of FIG. 20. As shown in the example scenario 2400 of FIG. 24, equipment 2430 may be operatively coupled to the system 2420 and/or the system 2420 may be implemented at least in part within one or more components of the equipment 2430. For example, a component of a drillstring, a component of a surface rig, etc., may include one or more processors, memory, one or more interfaces, etc.

As shown in the example of FIG. 24, the equipment 2430 includes one or more dynamic subs where at least one of the dynamic subs may be at a location in a drillstring determined based at least in part on a model-based analysis. As an example, the system 2420 can include circuitry that may be implemented in hardware or hardware and software (e.g., and/or firmware) that can process information as to RPM 2451, acceleration 2452, force 2453, stress 2454, movement 2455, deformation 2456 and/or one or more other physical phenomena associated with a drilling operation or drilling operations.

As an example, the system 2420 can provide for selection of a set of dynamic parameters for one or more components of a toolstring, which may be or include a drillstring that includes a drill bit. As an example, a toolstring can be or include a bottom hole assembly (BHA). As an example, the system 2420 may process information where the information includes information from at least one sensor of a toolstring to identify one or more issues associated with operation of the toolstring. In such an example, the system 2420 can include determining a root cause, for example, by performing a root cause analysis for at least one identified issue.

In the example of FIG. 24, the equipment 2430 is illustrated as including a drillstring with at least two dynamic subs at two different positions along the drillstring where, during operation of the drillstring (e.g., at least in part via a surface rig), the system 2420 can receive information and generate simulation results for one or more other positions along the drillstring. In such an example, the system 2420 can include generating results for center movement such as shown in a plot 2432 of center movement trajectory where such results can be for one or more positions along the drillstring. In such an example, an issue may be identified such as, for example, backward whirling. As an example, a root cause analysis may be performed to determine a cause or causes of the backward whirling. Based at least in part on one or more causes, the system 2420 can include controlling one or more aspects of the drilling operation, for example, to reduce the backward whirling. While backward whirling is mentioned as an issue with one or more causes and associated control action(s), the system 2420 may detect one or more other types of issues, determine one or more other types of causes, perform one or more other types of control actions, etc. As mentioned, an issue can be a rotational issue. As an example, a rotational issue may be a sticking issue, a slipping issue, or other type of issue associated with rotation of a drillstring, which may occur during advancement and/or during retraction (e.g., partial and/or full).

As an example, a method can include receiving data acquired via a sensor of a component of a plurality of components arranged in an order at respective axial positions of a toolstring; analyzing at least a portion of the data with respect to a model of the toolstring to generate results; and controlling the toolstring based at least in part on the results. In such an example, the results can include values for at least one dynamic parameter of the toolstring.

As an example, a toolstring can be disposed in a bore of a formation where a method includes receiving data acquired via a sensor of a component of a plurality of components arranged in an order at respective axial positions of the toolstring; analyzing at least a portion of the data with respect to a model of the toolstring to generate results; and controlling the toolstring based at least in part on the results where, for example, the analyzing can include analyzing based at least in part on formation data for at least one other bore in the formation. For example, a formation data can include data from one or more logs, which may include well logs from one or more wells that are offset from a bore in which the toolstring is disposed.

As an example, a method can include receiving data acquired via a sensor of a component of a plurality of components arranged in an order at respective axial positions of a toolstring; analyzing at least a portion of the data with respect to a model of the toolstring to generate results; and controlling the toolstring based at least in part on the results wherein the controlling includes closed loop controlling and/or open loop controlling.

As an example, a method can include receiving data acquired via a sensor of a component of a plurality of components arranged in an order at respective axial positions of a toolstring; analyzing at least a portion of the data with respect to a model of the toolstring to generate results; and controlling the toolstring based at least in part on the results where, for example, the analyzing includes determining a cause of at least one issue. In such an example, the issue can be a vibration issue where the controlling can control the toolstring to alter vibration (e.g., consider closed and/or open loop control).

As an example, a method can include receiving data acquired via a sensor of a component of a plurality of components arranged in an order at respective axial positions of a toolstring; analyzing at least a portion of the data with respect to a model of the toolstring to generate results; and controlling the toolstring based at least in part on the results where the results include results for a plurality of the respective axial positions.

As an example, a method can include receiving data from a plurality of sensors where at least two of the plurality of sensors are at different axial positions. For example, consider a toolstring that includes a first dynamic sub positioned a first distance from a drill bit and a second dynamic sub positioned at a second distance from the drill bit. In such an example, the dynamic subs may be configured differently, for example, the first for measuring vibration associated with the drill bit and the second for measuring vibration of the toolstring due at least in part to rotation of the drill bit.

As an example, a method can include analyzing dynamic sub data using a model to generate results at at least one axial position above or below an axial position of the dynamic sub (e.g., a component that includes one or more vibration sensors, etc.).

As an example, a method can include determining a position for a dynamic sub or dynamic subs along a toolstring and, for example, building the toolstring with the one or more dynamic subs at their respective positions.

As an example, a system can include a processor; memory operatively coupled to the processor; a network interface operatively coupled to the processor; and instructions stored in the memory and executable by the processor to instruct the system to: receive data acquired via a sensor of a component of a plurality of components arranged in an order at respective axial positions of a toolstring; analyze at least a portion of the data with respect to a model of the toolstring to generate results; and control the toolstring based at least in part on the results. In such an example, the system can include instructions to instruct the system to control the toolstring in an open loop control mode and/or instructions to instruct the system to control the toolstring in a closed loop control mode.

As an example, results can include values for at least one dynamic parameter of a toolstring. As an example, a system can include instructions to instruct the system to identify an issue and to determine a cause of the issue. In such an example, instructions can be included in the system to instruct the system to control the toolstring to mitigate the issue. For example, one or more operational parameter values may be adjusted to mitigate the issue.

As an example, one or more computer-readable storage media can include processor-executable instructions executable to instruct a computer to: receive data acquired via a sensor of a component of a plurality of components arranged in an order at respective axial positions of a toolstring; analyze at least a portion of the data with respect to a model of the toolstring to generate results; and control the toolstring based at least in part on the results. In such an example, the instructions can include instructions to instruct the computer to control the toolstring in an open loop control mode and/or instructions to instruct the computer to control the toolstring in a closed loop control mode.

According to an embodiment, one or more computer-readable media may include computer-executable instructions to instruct a computing system to output information for controlling a process. For example, such instructions may provide for output to sensing process, an injection process, drilling process, an extraction process, an extrusion process, a pumping process, a heating process, etc.

Figure 25:
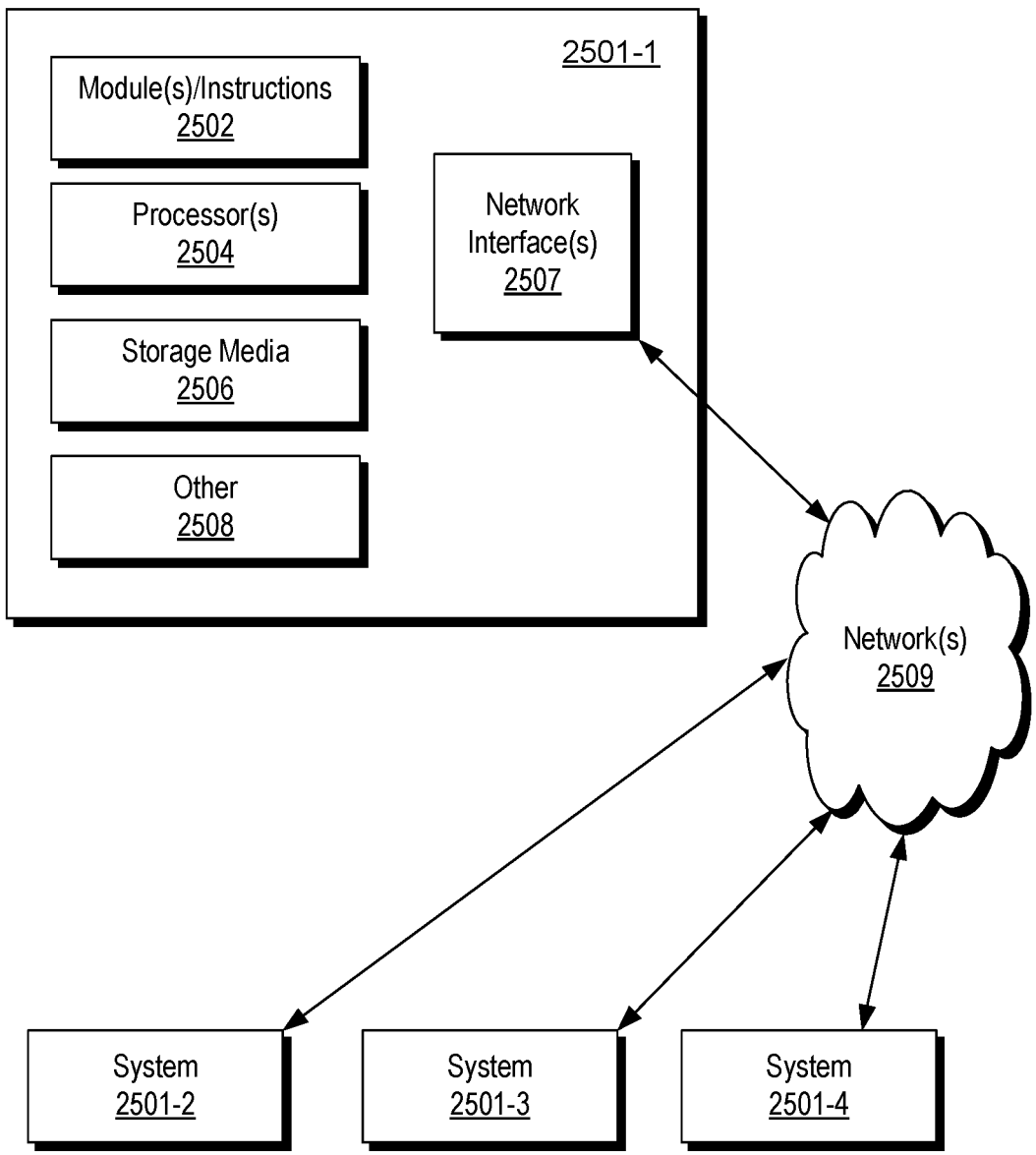
FIG. 25 illustrates an example of a system.

In some embodiments, a method or methods may be executed by a computing system. FIG. 25 shows an example of a system 2500 that can include one or more computing systems 2501-1, 2501-2, 2501-3 and 2501-4, which may be operatively coupled via one or more networks 2509, which may include wired and/or wireless networks.

As an example, a system can include an individual computer system or an arrangement of distributed computer systems. In the example of FIG. 25, the computer system 2501-1 can include one or more modules 2502, which may be or include processor-executable instructions, for example, executable to perform various tasks (e.g., receiving information, requesting information, processing information, simulation, outputting information, etc.).

As an example, a module may be executed independently, or in coordination with, one or more processors 2504, which is (or are) operatively coupled to one or more storage media 2506 (e.g., via wire, wirelessly, etc.). As an example, one or more of the one or more processors 2504 can be operatively coupled to at least one of one or more network interface 2507. In such an example, the computer system 2501-1 can transmit and/or receive information, for example, via the one or more networks 2509 (e.g., consider one or more of the Internet, a private network, a cellular network, a satellite network, etc.).

As an example, the computer system 2501-1 may receive from and/or transmit information to one or more other devices, which may be or include, for example, one or more of the computer systems 2501-2, etc. A device may be located in a physical location that differs from that of the computer system 2501-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 2506 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

Figure 26:
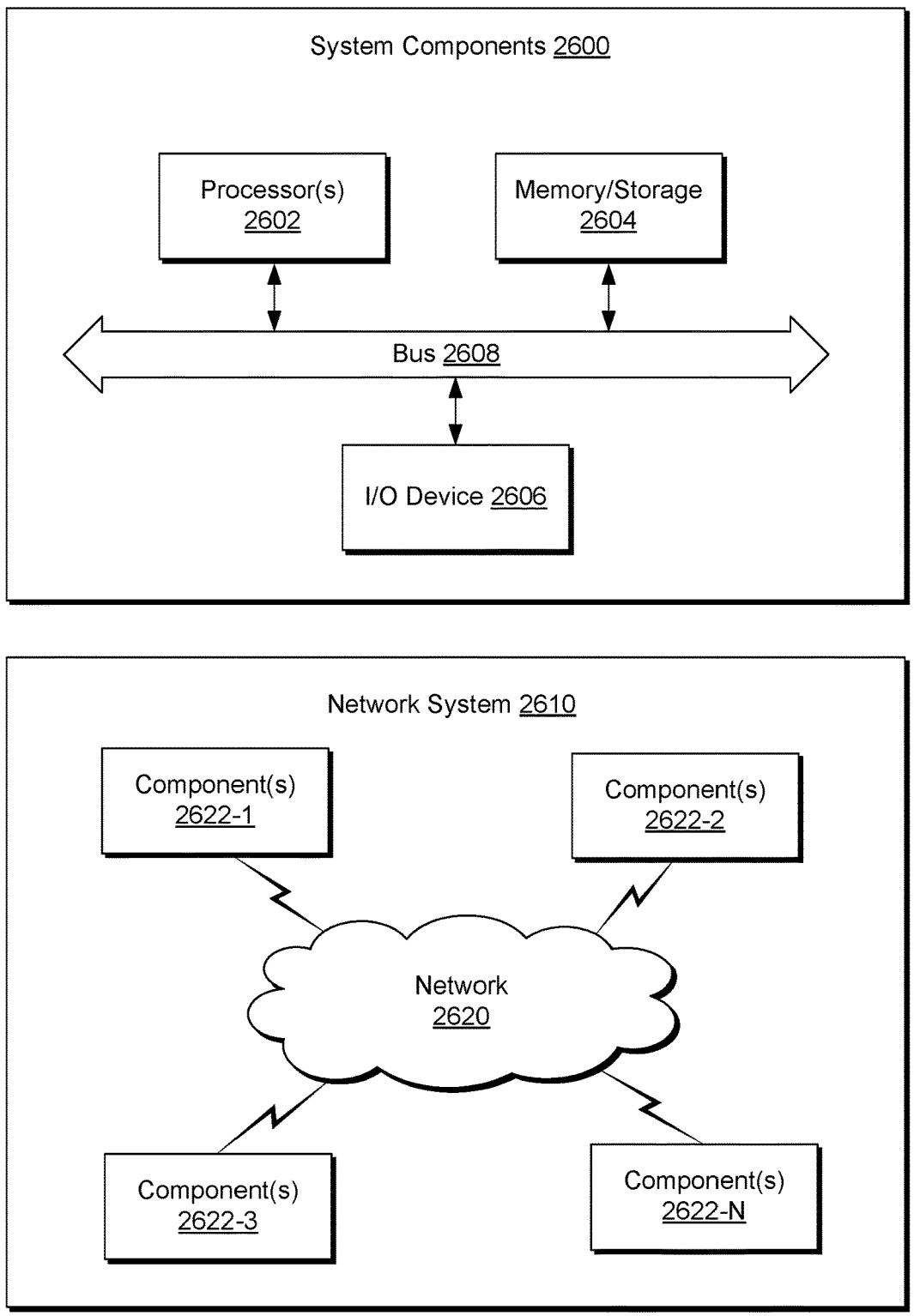
FIG. 26 illustrates example components of a system and a networked system.

FIG. 26 shows components of a computing system 2600 and a networked system 2610. The system 2600 includes one or more processors 2602, memory and/or storage components 2604, one or more input and/or output devices 2606 and a bus 2608. According to an embodiment, instructions may be stored in one or more computer-readable media (e.g., memory/storage components 2604). Such instructions may be read by one or more processors (e.g., the processor(s) 2602) via a communication bus (e.g., the bus 2608), which may be wired or wireless. The one or more processors may execute such instructions to implement (wholly or in part) one or more attributes (e.g., as part of a method). A user may view output from and interact with a process via an I/O device (e.g., the device 2606). According to an embodiment, a computer-readable medium may be a storage component such as a physical memory storage device, for example, a chip, a chip on a package, a memory card, etc.

According to an embodiment, components may be distributed, such as in the network system 2610. The network system 2610 includes components 2622-1, 2622-2, 2622-3, . . . 2622-N. For example, the components 2622-1 may include the processor(s) 2602 while the component(s) 2622-3 may include memory accessible by the processor(s) 2602. Further, the component(s) 2602-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
performing a pre-run simulation of a drillstring using a component-based model of the drillstring, borehole trajectory information and formation information to determine respective different axial positions of a first component and a second component that increase measurement accuracy and sensitivity of a first sensor of the first component and a second sensor of the second component to dynamic mechanical behavior of the drillstring wherein the pre-run simulation predicts a statistical, axial distribution of one or more dynamic mechanical drilling parameters of the drillstring in a borehole of a formation measurable by at least one of the first sensor and the second sensor to determine at least one of the different axial positions using a maximum statistical variation at each of one or more axial positions along the drillstring;

receiving data acquired during drilling of the borehole, wherein the data comprise rate of penetration data and downhole sensor data acquired via at least the first sensor of the first component and the second sensor of the second component of a plurality of components arranged in an order at respective axial positions of the drillstring, wherein the first sensor and the second sensor comprise the respective different axial positions;

using at least a portion of the data, validating a simulated rate of penetration of the component-based model of the drillstring and validating simulated dynamic mechanical drilling parameter values of the component-based model of the drillstring with respect to time for axial positions along the drillstring as disposed in the borehole of the formation during the drilling of the borehole;

analyzing the validated simulated dynamic mechanical drilling parameter values to generate results; and controlling the drillstring based at least in part on the results.

2. The method of claim 1 wherein the validating the simulated dynamic mechanical drilling parameter values comprises comparing the at least a portion of the data and one or more of simulated dynamic mechanical drilling parameter values and wherein the at least a portion of the data comprises lateral acceleration data.

3. The method of claim 1 wherein the drillstring is disposed in the borehole of the formation characterized by the formation information and wherein the analyzing comprises analyzing based at least in part on formation information for at least one other borehole in the formation.

4. The method of claim 1 wherein the controlling comprises closed loop controlling or wherein the controlling comprises open loop controlling.

5. The method of claim 1 wherein locations of the first component and the second component are determined via values from the pre-run simulation with respect to axial position of the drillstring wherein the values comprise bending moment values, lateral acceleration values or bending moment values and lateral acceleration values.

6. The method of claim 1 wherein the analyzing comprises determining a cause of at least one issue.

7. The method of claim 6 wherein the issue comprises a vibration issue of the drillstring disposed in the borehole and wherein the controlling controls the drillstring to alter vibration of the drillstring disposed in the borehole.

8. The method of claim 1 wherein the results comprise results for a plurality of the respective axial positions.

9. The method of claim 1 wherein the simulated dynamic drilling parameter values of the component-based model of the drillstring comprise values for an axial position of the first sensor and values for an axial position of the second sensor and wherein the validating the simulated dynamic drilling parameter values compares the values for the axial position of the first sensor and the values for the axial position of the second sensor to the data acquired via at least the first sensor of the first component and the second sensor of the second component.

10. The method of claim 1 wherein the analyzing generates results for at least one axial position above or below the respective axial position of the first component that comprises the first sensor and for at least one axial position above or below the respective axial position of the second component that comprises the second sensor.

11. The method of claim 1 comprising building the drillstring with the first component and the second component at the respective different axial positions.

12. A system comprising:
a processor;
memory operatively coupled to the processor;
a network interface operatively coupled to the processor; and
instructions stored in the memory and executable by the processor to instruct the system to:
perform a pre-run simulation of a drillstring using a component-based model of the drillstring, borehole trajectory information and formation information to determine respective different axial positions of a first component and a second component that increase measurement accuracy and sensitivity of a first sensor of the first component and a second sensor of the second component to dynamic mechanical behavior of the drillstring wherein the pre-run simulation predicts a statistical, axial distribution of one or more dynamic mechanical drilling parameters of the drillstring in a borehole of a formation measurable by at least one of the first sensor and the second sensor to determine at least one of the different axial positions using a maximum statistical variation at each of one or more axial positions along the drillstring;
receive data acquired during drilling of the borehole, wherein the data comprise rate of penetration data and downhole sensor data acquired via at least the first sensor of the first component and the second sensor of the second component of a plurality of components arranged in an order at respective axial positions of the drillstring wherein the first sensor and the second sensor comprise the respective different axial positions;
using at least a portion of the data, validate a simulated rate of penetration of the component-based model of the drillstring and validate simulated dynamic mechanical drilling parameter values of the component-based model of the drillstring with respect to time for axial positions along the drillstring as disposed in the borehole of the formation during the drilling of the borehole;
analyze the validated simulated dynamic mechanical drilling parameter values to generate results; and
control the drillstring based at least in part on the results.

13. The system of claim 12 wherein the instructions comprise instructions to instruct the system to control the drillstring in an open loop control mode.

14. The system of claim 12 wherein the instructions comprise instructions to instruct the system to control the drillstring in a closed loop control mode.

15. The system of claim 12 wherein the validation of the simulated dynamic mechanical drilling parameter values comprises comparing the at least a portion of the data and one or more of the simulated dynamic mechanical drilling parameter values and wherein the at least a portion of the data comprises lateral acceleration data of the drillstring disposed in the borehole.

16. The system of claim 12 wherein the instructions comprise instructions to instruct the system to utilize the results to identify an issue and to determine a cause of the issue.

17. The system of claim 16 wherein the instructions comprise instructions to instruct the system to control the drillstring to mitigate the issue.

18. One or more non-transitory computer-readable storage media that comprises processor-executable instructions executable to instruct a computer to:

perform a pre-run simulation of a drillstring using a component-based model of the drillstring, borehole trajectory information and formation information to determine respective different axial positions of a first component and a second component that increase measurement accuracy and sensitivity of a first sensor of the first component and a second sensor of the second component to dynamic mechanical behavior of the drillstring wherein the pre-run simulation predicts a statistical, axial distribution of one or more dynamic mechanical drilling parameters of the drillstring in a borehole of a formation measurable by at least one of the first sensor and the second sensor to determine at least one of the different axial positions using a maximum statistical variation at each of one or more axial positions along the drillstring;

receive data acquired during drilling of the borehole, wherein the data comprise rate of penetration data and downhole sensor data acquired via at least the first sensor of the first component and the second sensor of the second component of a plurality of components arranged in an order at respective axial positions of the drillstring wherein the first sensor and the second sensor comprise the respective different axial positions;

using at least a portion of the data, validate a simulated rate of penetration of the component-based model of the drillstring and validate simulated dynamic mechanical drilling parameter values of the component-based model of the drillstring with respect to time for axial positions along the drillstring as disposed in the borehole of the formation during the drilling of the borehole;

analyze the validated simulated dynamic mechanical drilling parameter values to generate results; and control the drillstring based at least in part on the results.

19. The one or more non-transitory computer-readable storage media of claim 18 wherein the instructions comprise instructions to instruct the computer to control the drillstring in an open loop control mode.

20. The one or more non-transitory computer-readable storage media of claim 18 wherein the instructions comprise instructions to instruct the computer to control the drillstring in a closed loop control mode.

* * * * *